United States Patent
Park et al.

(10) Patent No.: US 12,349,090 B2
(45) Date of Patent: Jul. 1, 2025

(54) METHOD FOR TRANSMITTING UPLINK SIGNAL BY TERMINAL IN WIRELESS COMMUNICATION SYSTEM, AND APPARATUS THEREFOR

(71) Applicant: LG Electronics Inc., Seoul (KR)

(72) Inventors: Haewook Park, Seoul (KR); Suckchel Yang, Seoul (KR); Seokmin Shin, Seoul (KR); Kijun Kim, Seoul (KR); Hyunsoo Ko, Seoul (KR)

(73) Assignee: LG Electronics Inc., Seoul (KR)

(*) Notice: Subject to any disclaimer, the term of this patent is extended or adjusted under 35 U.S.C. 154(b) by 121 days.

(21) Appl. No.: 17/791,429

(22) PCT Filed: Jan. 14, 2022

(86) PCT No.: PCT/KR2022/000709
§ 371 (c)(1),
(2) Date: Jul. 7, 2022

(87) PCT Pub. No.: WO2022/154559
PCT Pub. Date: Jul. 21, 2022

(65) Prior Publication Data
US 2023/0254794 A1  Aug. 10, 2023

(30) Foreign Application Priority Data

Jan. 15, 2021 (KR) .......... 10-2021-0006336
Apr. 6, 2021 (KR) .......... 10-2021-0044708
(Continued)

(51) Int. Cl.
*H04W 56/00* (2009.01)
*H04W 74/04* (2009.01)
*H04W 84/06* (2009.01)

(52) U.S. Cl.
CPC ....... *H04W 56/0045* (2013.01); *H04W 74/04* (2013.01); *H04W 84/06* (2013.01)

(58) Field of Classification Search
CPC ............ H04W 56/0045; H04W 74/04; H04W 74/0833; H04W 84/06; H04W 88/06;
(Continued)

(56) References Cited

U.S. PATENT DOCUMENTS

2020/0413451 A1   12/2020  Boroujeni et al.
2021/0352606 A1*  11/2021  Hosseinian ......... H04W 56/005
(Continued)

OTHER PUBLICATIONS

International Search Report in International Appln. No. PCT/KR2022/000709, dated May 9, 2022, 11 pages (with English translation).
(Continued)

*Primary Examiner* — Ricardo H Castaneyra
(74) *Attorney, Agent, or Firm* — Fish & Richardson P.C.

(57) ABSTRACT

Disclosed are a method and an apparatus for transmitting an uplink signal by a terminal in a wireless communication system supporting a non-terrestrial network (NTN) according to various embodiments. The method includes receiving system information for configuring a first K offset, receiving a control signal for configuring or updating a second K offset based on the first K offset, and transmitting the uplink signal based on the first K offset or the second K offset, wherein, based on the uplink signal being related to a random access channel (RACH), the uplink signal is transmitted based on the first K offset.

9 Claims, 19 Drawing Sheets

(30) Foreign Application Priority Data

May 11, 2021 (KR) .......... 10-2021-0060633
Oct. 1, 2021 (KR) .......... 10-2021-0131061

(58) Field of Classification Search
CPC .......... H04W 74/0838; H04W 74/0836; H04B 7/18513
USPC .......... 370/316
See application file for complete search history.

(56) References Cited

U.S. PATENT DOCUMENTS

2021/0392602 A1* 12/2021 Sengupta .......... H04W 56/0005
2022/0166536 A1* 5/2022 Ma .......... H04W 72/0446
2022/0408389 A1* 12/2022 Wang .......... H04W 56/005

OTHER PUBLICATIONS

MediaTek Inc., "Timing relationship enhancements for NR-NTN," R1-2005495, Presented at 3GPP TSG RAN WG1 Meeting #102e, Aug. 24-28, 2020, 6 pages.
Oppo, "Discussion on timing relationship enhancement," R1-2006029, Presented at 3GPP TSG RAN WG1 #102, e-Meeting, Aug. 17-28, 2020, 3 pages.
Qualcomm Incorporated, "Enhancements on Timing Relationship for NTN," R1-2006804, Presented at 3GPP TSG RAN WG1 #102-e, e-Meeting, Aug. 17-28, 2020, 4 pages.
ZTE, "Discussion on timing relationship for Ntn," R1-2005963, Presented at 3GPP TSG RAN WG1 #102-e, e-Meeting, Aug. 17-28, 2020, 4 pages.
ETRI, "Discussion on timing relationship enhancement for NTN," 3GPP TSG RAN WG1 #103-e, R1-2009015, e-Meeting, Oct. 26-Nov. 13, 2020, 2 pages.
Extended European Search Report in European Appln. No. 22739752.8, mailed on Nov. 6, 2023, 15 pages.
Huawei, HiSilicon, "Discussion on timing relationship enhancements for NTN," 3GPP TSG RAN WG1 Meeting #103-e, RI-2007569, E-meeting, Oct. 26-Nov. 13, 2020, 6 pages.
Oppo, "Discussion on timing relationship enhancement," 3GPP TSG RAN WGI #103-e, R1-2008253, e-Meeting, Oct. 26-Nov. 13, 2020, 4 pages.
Panasonic, "Timing relationship enhancement for NTN," 3GPP TSG RAN WG1 #103e, R1-2009049, E-meeting, Oct. 26-Nov. 13, 2020, 5 pages.
Huawei, HiSilicon, "Discussion on physical layer control procedures for NTN," 3GPP TSG RAN WGI Meeting #99, R1-1911859, Reno, USA, Nov. 18-22, 2019, 5 pages.
MediaTek Inc., "Summary#4 of 8.4.4 Other Aspects of NR-NTN," 3GPP TSG RAN WGI Meeting #102e, R1-2007233, e-Meeting, Aug. 17-28, 2020, 47 pages.
Office Action in Japanese Appln. No. 2023-512321, mailed on Feb. 6, 2024, 24 pages (with English translation).
Thales, "Other RAN1 aspects for NR NTN," 3GPP TSG-RAN WG1 #102-e, R1-2006678, e-Meeting, Aug. 17-28, 2020, 31 pages.

\* cited by examiner (a)

(b)

(a)

(b)

(a)

(b)

- Common TA (Tcom) = 2*D0/c
- UE specific differential TA for xth UE (TUEx) = 2*(D1x-D0)/c
- Full TA (Tfull) = Tcom+TUEx (a) Regenerative payload

- Common TA (Tcom) = 2*(D01+D02)/c
- UE specific differential TA for xth UE (TUEx) = 2*(D1x-D01)/c
- Full TA (Tfull) = Tcom+TUEx (b) Transparent payload (a)

(b)

METHOD FOR TRANSMITTING UPLINK SIGNAL BY TERMINAL IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2022/000709, filed on Jan. 14, 2022, which claims the benefit of Korean Application No. 10-2021-0131061, filed on Oct. 1, 2021, Korean Application No. 10-2021-0060633, filed on May 11, 2021, Korean Application No. 10-2021-0044708, filed on Apr. 6, 2021, and Korean Application No. 10-2021-0006336, filed on Jan. 15, 2021. The disclosures of the prior applications are hereby incorporated by reference herein in their entirety.

TECHNICAL FIELD

The present disclosure relates to a method for transmitting an uplink signal by a terminal in a wireless communication system supporting a non-terrestrial network (NTN), and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR).

DISCLOSURE

Technical Problem

An object of the present disclosure devised to provide a method and apparatus for determining transmission timing of an uplink signal related to RACH based on a cell-specific K offset that is a K offset set by system information such that a fall-back operation of a terminal is ensured as much as possible.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

In one aspect of the present disclosure, a method for transmitting an uplink signal by a terminal in a wireless communication system supporting a non-terrestrial network (NTN) may include receiving system information for configuring a first K offset, receiving a control signal for configuring or updating a second K offset based on the first K offset, and transmitting the uplink signal based on the first K offset or the second K offset. Based on the uplink signal being related to a random access channel (RACH), the uplink signal may be transmitted based on the first K offset.

Alternatively, based on the uplink signal being unrelated to the RACH, the uplink signal may be transmitted based on the first K offset and the second K offset.

Alternatively, the second K offset may be configured or updated based on a difference between the first K offset and the second K offset included in a media access control element (MAC-CE) of the control signal.

Alternatively, the second K offset updated by the difference may be applied x preconfigured slots after a time when an ACK for successful reception of the MAC-CE is transmitted or a time when the ACK is received by a base station.

Alternatively, the first K offset may be a value for configuring a cell-specific K offset, wherein the first K offset is not updated by a media access control element (MAC-CE) of the control signal.

Alternatively, a transmission timing of the uplink signal may be determined based on the first K offset and the second K offset.

Alternatively, the signal related to the RACH procedure is an uplink signal scheduled by a random access response (RAR) uplink grant.

Alternatively, the second K offset may be configured for each of a plurality of bandwidth parts (BWP).

Alternatively, the second K offset may be configured for each of a plurality of beam groups.

Alternatively, the uplink signal related to the RACH procedure for contention free random access (CFRA) may be transmitted based on the second K offset.

In another aspect of the present disclosure, a method for receiving an uplink signal by a base station in a wireless communication system supporting a non-terrestrial network (NTN) may include transmitting system information for configuring a first K offset for determining a transmission timing of the uplink signal, transmitting a control signal for configuring or updating a second K offset based on the first K offset, and receiving the uplink signal based on the first K offset or the second K offset. Based on the uplink signal being related to a random access channel (RACH), the uplink signal may be received based on the first K offset.

Alternatively, based on the uplink signal being unrelated to the RACH, the uplink signal is received based on the second K offset.

In another aspect of the present disclosure, a terminal for transmitting an uplink signal in a wireless communication system supporting a non-terrestrial network (NTN) may include a radio frequency (RF) transceiver, and a processor connected to the RF transceiver, wherein the processor controls the RF transceiver to receive system information for configuring a first K offset, receive a control signal for configuring or updating a second K offset based on the first K offset, and transmit the uplink signal based on the first K offset or the second K offset, wherein, based on the uplink signal being related to a random access channel (RACH), the uplink signal may be transmitted based on the first K offset.

In another aspect of the present disclosure, a base station for receiving an uplink signal in a wireless communication system supporting a non-terrestrial network (NTN) may include a radio frequency (RF) transceiver, and a processor connected to the RF transceiver, wherein the processor controls the RF transceiver to transmit system information for configuring a first K offset, transmit a control signal for configuring or updating a second K offset based on the first K offset, and receive the uplink signal based on the first K offset or the second K offset, wherein, based on the uplink signal being related to a random access channel (RACH) procedure, the uplink signal may be received based on the first K offset.

In another aspect of the present disclosure, a chipset for transmitting an uplink signal in a wireless communication system supporting a non-terrestrial network (NTN) may include at least one processor, and at least one memory operatively coupled to the at least one processor and, when executed, causing the at least one processor to perform an operation. The operation may include receiving system information for configuring a first K offset, receiving a control signal for configuring or updating a second K offset based on the first K offset, and transmitting the uplink signal based on the first K offset or the second K offset, wherein, based on the uplink signal being related to a random access channel (RACH), the uplink signal may be transmitted based on the first K offset.

In another aspect of the present disclosure, a computer-readable storage medium including at least one computer program for performing an operation of transmitting an uplink signal in a wireless communication system supporting a non-terrestrial network (NTN) may include at least one computer program configured to cause the at least one processor to perform an operation of transmitting the uplink signal, and a computer-readable storage medium configured to store the at least one computer program, wherein the operation may include receiving system information for configuring a first K offset, receiving a control signal for configuring or updating a second K offset based on the first K offset, and transmitting the uplink signal based on the first K offset or the second K offset, wherein, based on the uplink signal being related to a random access channel (RACH), the uplink signal may be transmitted based on the first K offset.

Advantageous Effects

According to various embodiments, even when a terminal-specific K offset is configured or updated, an uplink signal may be transmitted based on an initial value (cell-specific K offset) set by system information for the uplink signal related to a RACH. Accordingly, a fall-back operation of the terminal related to the RACH procedure may be ensured.

In addition, in setting a K offset for the terminal, the K offset for each of a plurality of beam groups may be set to reduce. Thereby, the signaling overhead may be reduced compared to the case where the K offset is set for each beam, and the K offset may be set for the terminal at a finer granularity.

In addition, by specifically defining the conditions under which the update of the terminal-specific K offset is triggered, a request for the update of the terminal-specific K offset may be performed in an appropriate situation.

In addition, by clearly specifying the update time of the K offset, ambiguity of whether to apply the update of the K offset between the terminal and the base station may be resolved.

Further, when the timing of the UL-DL frame is not aligned in the base station, the signaling overhead may be minimized by explicitly/implicitly indicating the offset of K_mac in connection with the K offset.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
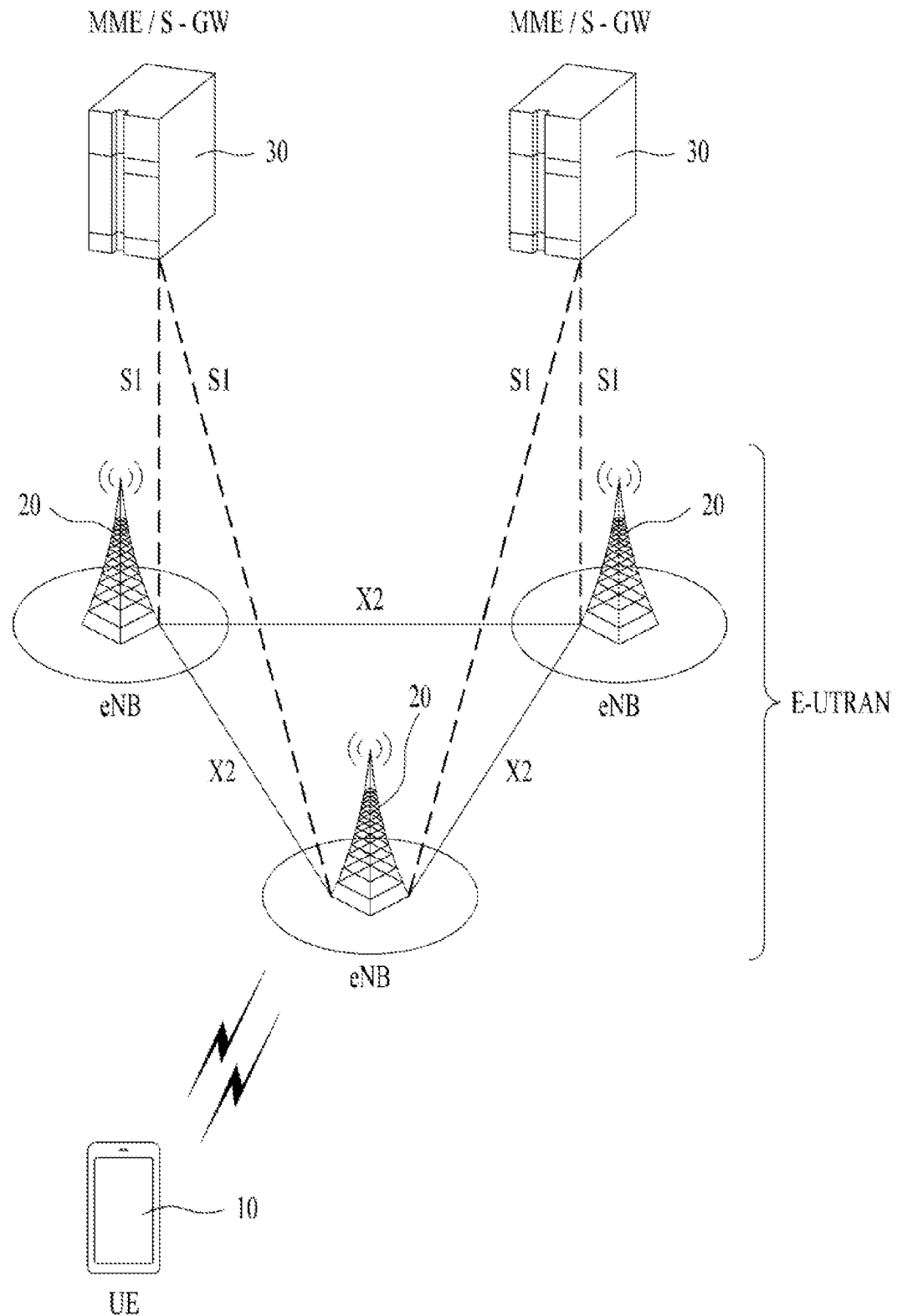
FIG. 1 illustrates the structure of an LTE system to which embodiment(s) are applicable.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
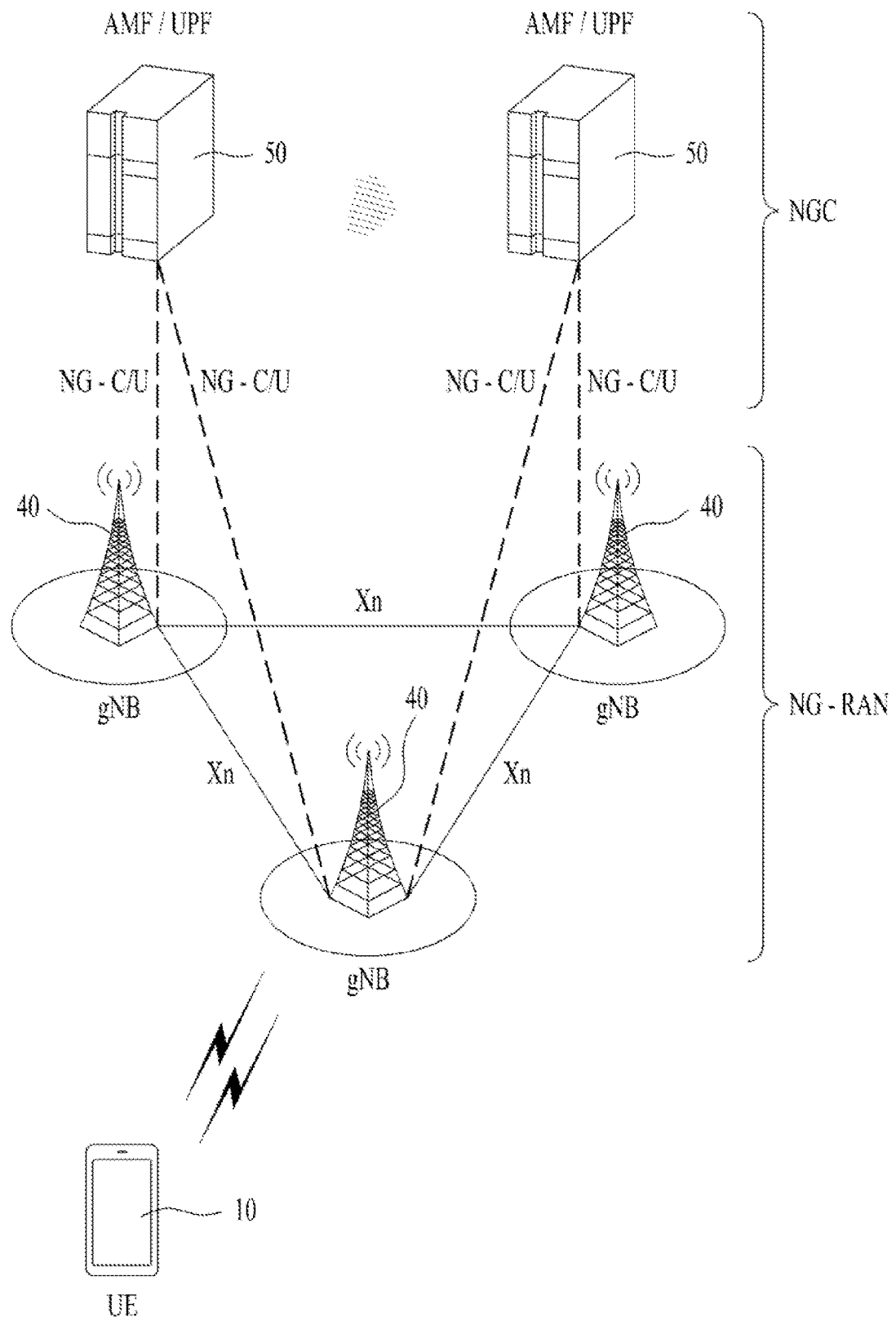
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
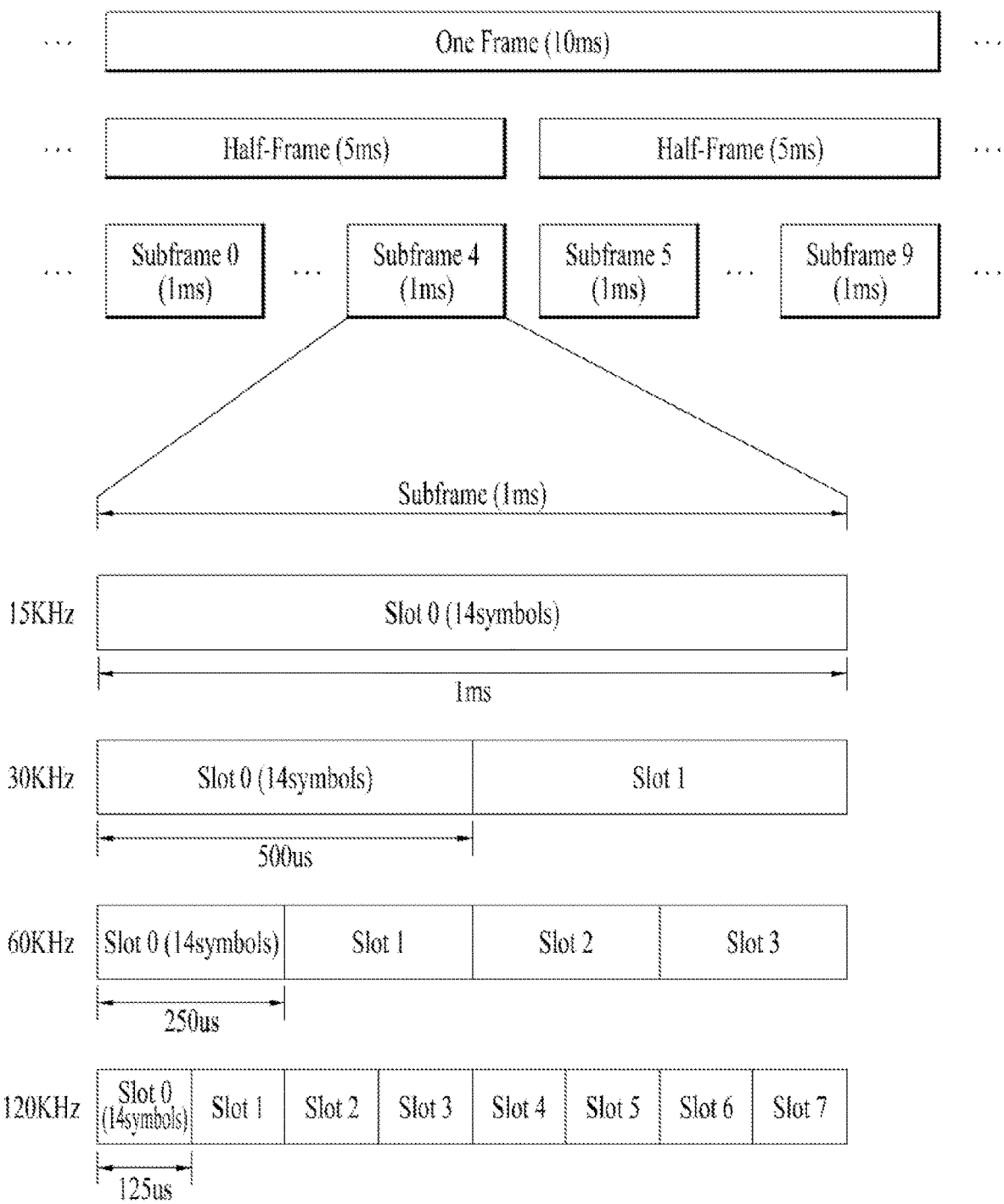
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration u in the NCP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM (A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHZ, 5900 MHz, 5925 MHz, etc.) or higher. For example, the frequency band of 6 GHz (or 5850 MHZ, 5900 MHZ, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 450 MHz-7125 MHz | 15, 30, 60 kHz |
| FR2 | 24250 MHz-52600 MHz | 60, 120, 240 kHz |

Figure 4:
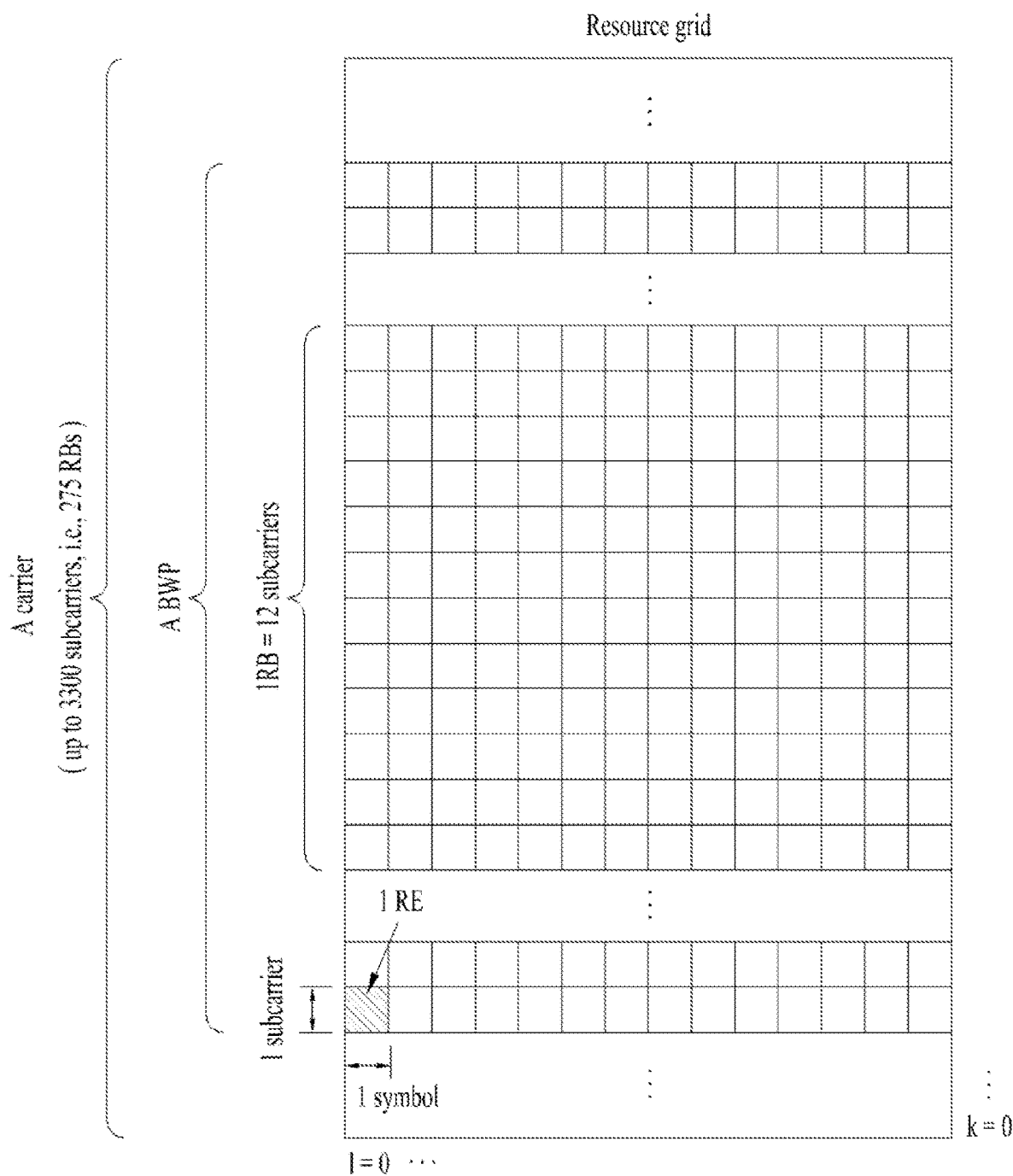
FIG. 4 illustrates the slot structure of an NR frame to which embodiment(s) are applicable.

FIG. 4 illustrates the slot structure of a NR frame to which the present disclosure is applicable.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Bandwidth Part (BWP)

In the NR system, up to 400 MHz may be supported per component carrier (CC). If a UE operating on a wideband CC always operates with the RF for the entire CCs turned on, the battery consumption of the UE may be increased. Alternatively, considering various use cases (e.g., eMBB, URLLC, Mmtc, V2X, etc.) operating within one wideband CC, different numerologies (e.g., sub-carrier spacings) may be supported for different frequency bands within a specific CC. Alternatively, the capability for the maximum bandwidth may differ among the UEs. In consideration of this, the BS may instruct the UE to operate only in a partial bandwidth, not the entire bandwidth of the wideband CC. The partial bandwidth is defined as a bandwidth part (BWP) for simplicity. Here, the BWP may be composed of resource blocks (RBs) contiguous on the frequency axis, and may correspond to one numerology (e.g., sub-carrier spacing, CP length, slot/mini-slot duration).

The BS may configure multiple BWPs in one CC configured for the UE. For example, a BWP occupying a relatively small frequency region may be configured in a PDCCH monitoring slot, and a PDSCH indicated by the PDCCH in a larger BWP may be scheduled. Alternatively, when UEs are concentrated in a specific BWP, some of the UEs may be configured in another BWP for load balancing. Alternatively, a spectrum in the middle of the entire bandwidth may be punctured and two BWPs on both sides may be configured in the same slot in consideration of frequency-domain inter-cell interference cancellation between neighbor cells. That is, the BS may configure at least one DL/UL BWP for the UE associated with the wideband CC and activate at least one DL/UL BWP among the configured DL/UL BWP(s) at a specific time (through L1 signaling, MAC CE or RRC signalling, etc.). The BS may instruct the UE to switch to another configured DL/UL BWP (through L1 signalling, MAC CE or RRC signalling, etc.). Alternatively, when a timer expires, the UE may switch to a predetermined DL/UL BWP. The activated DL/UL BWP is defined as an active DL/UL BWP. The UE may fail to receive DL/UL BWP configuration during an initial access procedure or before an RRC connection is set up. A DL/UL BWP assumed by the UE in this situation is defined as an initial active DL/UL BWP.

Figure 5:
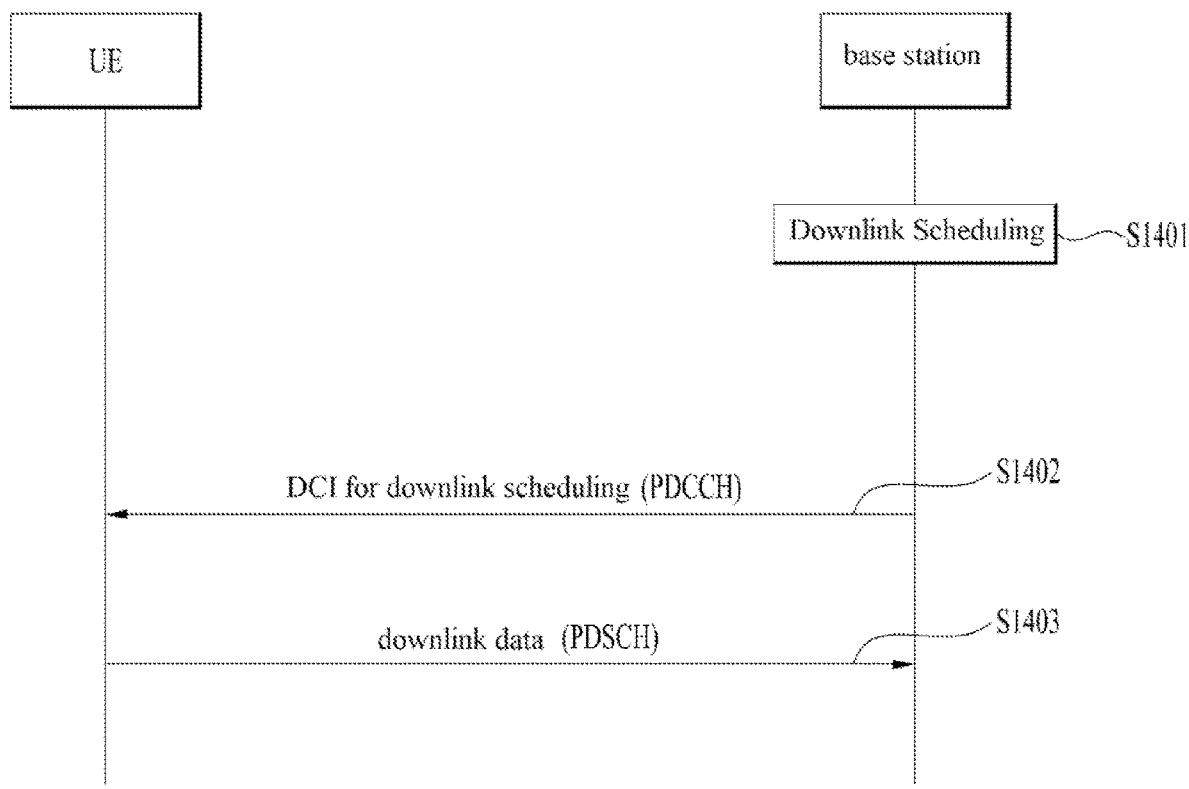
FIG. 5 illustrates a procedure in which a base station transmits a downlink signal to a UE.

FIG. 5 illustrates a procedure in which a base station transmits a downlink (DL) signal to a UE Referring to FIG. 5, the BS schedules DL transmission in relation to, for example, frequency/time resources, a transport layer, a DL precoder, and an MCS (S1401). In particular, the BS may determine a beam for PDSCH transmission to the UE through the above-described operations.

The UE receives downlink control information (DCI) for DL scheduling (i.e., including scheduling information about the PDSCH) from the BS on the PDCCH (S1402).

DCI format 1_0 or 1_1 may be used for DL scheduling. In particular, DCI format 1_1 includes the following information: an identifier for DCI formats, a bandwidth part indicator, frequency domain resource assignment, time domain resource assignment, a PRB bundling size indicator, a rate matching indicator, a ZP CSI-RS trigger, antenna port(s), transmission configuration indication (TCI), an SRS request, and a demodulation reference signal (DMRS) sequence initialization.

In particular, according to each state indicated in the antenna port(s) field, the number of DMRS ports may be scheduled, and single-user (SU)/multi-user (MU) transmission may also be scheduled.

In addition, the TCI field is configured in 3 bits, and the QCL for the DMRS is dynamically indicated by indicating a maximum of 8 TCI states according to the value of the TCI field.

The UE receives DL data from the BS on the PDSCH (S1403).

When the UE detects a PDCCH including DCI format 1_0 or 1_1, it decodes the PDSCH according to an indication by the DCI. Here, when the UE receives a PDSCH scheduled by DCI format 1, a DMRS configuration type may be configured for the UE by a higher layer parameter 'dmrs-Type', and the DMRS type is used to receive the PDSCH. In addition, the maximum number of front-loaded DMRS symbols for the PDSCH may be configured for the UE by the higher layer parameter 'maxLength'.

In the case of DMRS configuration type 1, when a single codeword is scheduled for the UE and an antenna port mapped to an index of {2, 9, 10, 11, or 30} is specified, or when two codewords are scheduled for the UE, the UE assumes that any of the remaining orthogonal antenna ports is not associated with PDSCH transmission to another UE.

Alternatively, in the case of DMRS configuration type 2, when a single codeword is scheduled for the UE and an antenna port mapped to an index of {2, 10, or 23} is specified, or when two codewords are scheduled for the UE, the UE assumes that any of the remaining orthogonal antenna ports is not associated with PDSCH transmission to another UE.

When the UE receives the PDSCH, it may assume that the precoding granularity P' is a consecutive resource block in the frequency domain. Here, P' may correspond to one of {2, 4, wideband}.

When P' is determined as wideband, the UE does not expect scheduling with non-contiguous PRBs, and may assume that the same precoding is applied to the allocated resources.

On the other hand, when P' is determined as any one of {2, 4}, a precoding resource block group (PRG) is divided into P' contiguous PRBs. The number of actually contiguous PRBs in each PRG may be greater than or equal to 1. The UE may assume that the same precoding is applied to contiguous DL PRBs in the PRG.

In order to determine a modulation order, a target code rate, and a transport block size in the PDSCH, the UE first reads the 5-bit MCD field in the DCI, and determines the modulation order and the target code rate. Then, it reads the redundancy version field in the DCI, and determines the redundancy version. Then, the UE determines the transport block size based on the number of layers and the total number of allocated PRBs before rate matching.

Figure 6:
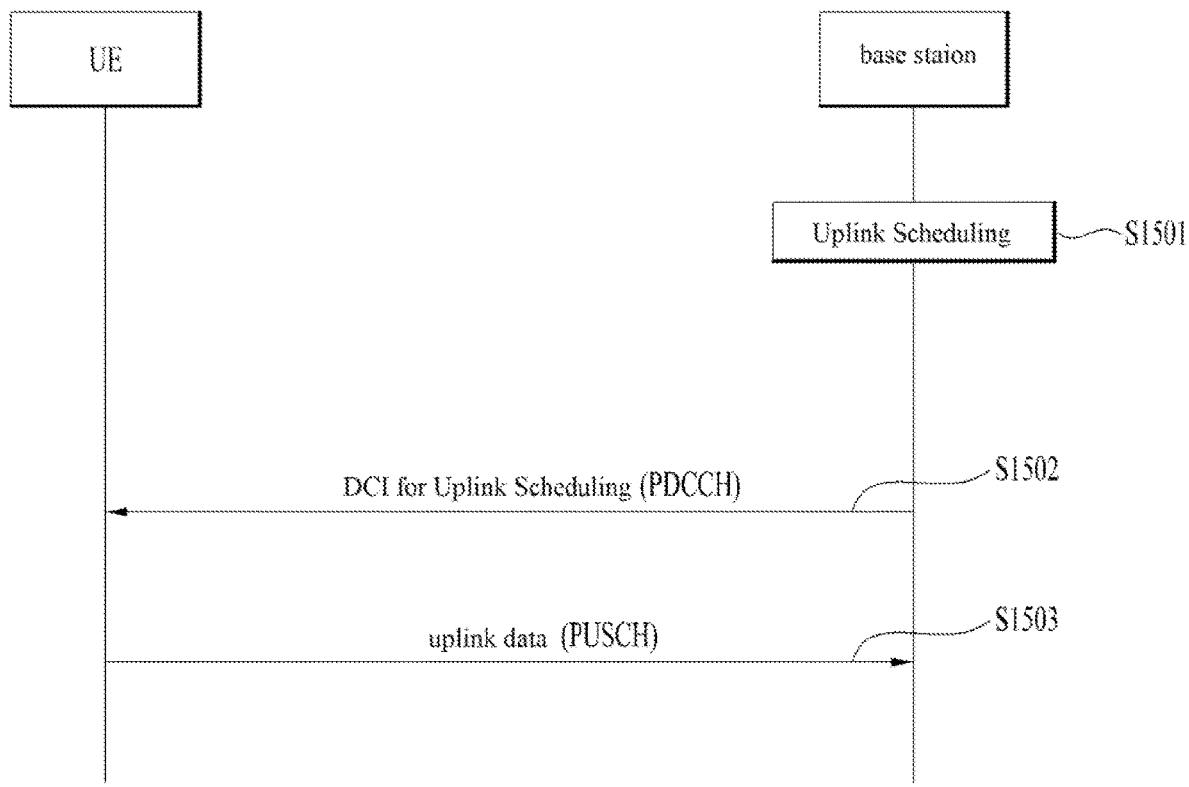
FIG. 6 illustrates a procedure in which a UE transmits an uplink signal to a base station.

FIG. 6 illustrates a procedure in which a UE transmits an uplink (UL) signal to a BS.

Referring to FIG. 6, the BS schedules UL transmission in relation to, for example, frequency/time resources, a transport layer, a UL precoder, and an MCS (S1501). In particular, the BS may determine, through the above-described operations, a beam for PUSCH transmission of the UE.

The UE receives DCI for UL scheduling (including scheduling information about the PUSCH) from the BS on the PDCCH (S1502).

DCI format 0_0 or 0_1 may be used for UL scheduling. In particular, DCI format 0_1 includes the following information: an identifier for DCI formats, a UL/supplementary UL (SUL), a bandwidth part indicator, frequency domain resource assignment, time domain resource assignment, a frequency hopping flag, a modulation and coding scheme (MCS), an SRS resource indicator (SRI), precoding information and number of layers, antenna port(s), an SRS request, DMRS sequence initialization, and UL shared channel (UL-SCH) indicator.

In particular, SRS resources configured in an SRS resource set associated with the higher layer parameter 'usage' may be indicated by the SRS resource indicator field. In addition, 'spatialRelationInfo' may be configured for each SRS resource, and the value thereof may be one of {CRI, SSB, SRI}.

The UE transmits UL data to the BS on PUSCH (S1503).

When the UE detects a PDCCH including DCI format 0_0 or 0_1, it transmits the PUSCH according to an indication by the DCI.

For PUSCH transmission, two transmission schemes are supported: codebook-based transmission and non-codebook-based transmission:

i) When the higher layer parameter 'txConfig' is set to 'codebook', the UE is configured for codebook-based transmission. On the other hand, when the higher layer parameter 'txConfig' is set to 'nonCodebook', the UE is configured for non-codebook based transmission. When the higher layer parameter 'txConfig' is not configured, the UE does not expect scheduling by DCI format 0_1. When the PUSCH is scheduled according to DCI format 0_0, PUSCH transmission is based on a single antenna port.

In the case of codebook-based transmission, the PUSCH may be scheduled by DCI format 0_0 or DCI format 0_1, or scheduled semi-statically. When the PUSCH is scheduled by DCI format 0_1, the UE determines the PUSCH transmission precoder based on the SRI, transmit precoding matrix indicator (TPMI) and transmission rank from the DCI, as given by the SRS resource indicator field and the precoding information and number of layers field. The TPMI is used to indicate a precoder to be applied across antenna ports, and corresponds to an SRS resource selected by the SRI when multiple SRS resources are configured. Alternatively, when a single SRS resource is configured, the TPMI is used to indicate a precoder to be applied across antenna ports, and corresponds to the single SRS resource. A transmission precoder is selected from the UL codebook having the same number of antenna ports as the higher layer parameter 'nrofSRS-Ports'. When the higher layer in which the UE is set to 'codebook' is configured with the parameter 'txConfig', at least one SRS resource is configured for the UE. The SRI indicated in slot n is associated with the most recent transmission of the SRS resource identified by the SRI, where the SRS resource precedes the PDCCH carrying the SRI (i.e., slot n).

ii) In the case of non-codebook-based transmission, the PUSCH may be scheduled by DCI format 0_0 or DCI format 0_1, or scheduled semi-statically. When multiple SRS resources are configured, the UE may determine the PUSCH precoder and transmission rank based on the wideband SRI. Here, the SRI is given by the SRS resource indicator in the DCI or by the higher layer parameter 'srs-ResourceIndicator'. The UE may use one or multiple SRS resources for SRS transmission. Here, the number of SRS resources may be configured for simultaneous transmission within the same RB based on UE capability. Only one SRS port is configured for each SRS resource. Only one SRS resource may be configured by the higher layer parameter 'usage' set to 'nonCodebook'. The maximum number of SRS resources that may be configured for non-codebook-based UL transmission is 4. The SRI indicated in slot n is associated with the most recent transmission of the SRS resource identified by the SRI, where the SRS transmission precedes the PDCCH carrying the SRI (i.e., slot n).

Figure 7:
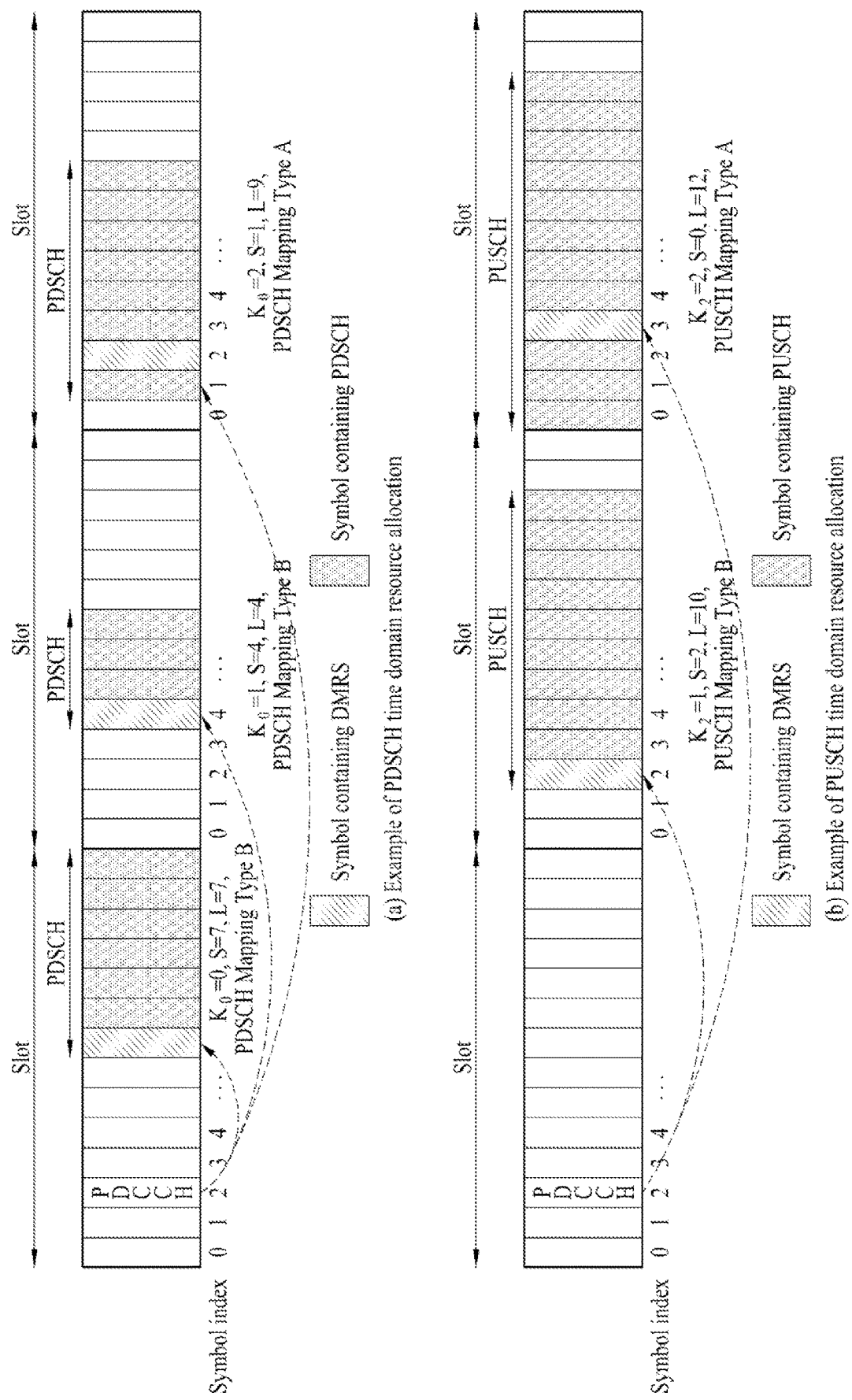
FIG. 7 illustrates an example of PDSCH TDRA caused by a PDCCH and an example of PUSCH TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH, or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH, or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission, information about a BWP for PDSCH or PUSCH transmission, and/or information about RBs for PDSCH or PUSCH transmission to the UE.

*Resource Allocation by RRC

As mentioned above, there are two types of transmission without a dynamic grant: configured grant Type 1 and configured grant Type 2. In configured grant Type 1, a UL grant is provided by RRC signaling and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC signaling per serving cell and per BWP. Multiple configurations may be simultaneously activated on different serving cells.

When configured grant Type 1 is configured, the UE may be provided with the following parameters through RRC signaling:
cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;
timeDomainAllocation value m that provides a row index m+1 pointing to the allocation table, indicating a combination of the start symbol S, the length L, and the PUSCH mapping type;
frequencyDomainAllocation that provides frequency domain resource allocation; and
mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to time DomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+ (slot number in the frame*numberOfSymbolsPerSlot)+symbol number in the slot]=(timeDomainOffset*numberOfSymbolsPerSlot+S+ N*periodicity) modulo (1024*numberOfSlotsPerFrame* numberOfSymbolsPerSlot), for all N>=0, where numberOfSlotsPerFrame and numberOfSymbolsPerSlot indicate the number of consecutive slots per frame and consecutive OFDM symbols per slot.

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+ (slot number in the frame* numberOfSymbolsPerSlot)+symbol number in the slot]= [(SFNstart time*number- OfSlotsPerFrame*numberOfSymbolsPerSlot+slotstart time*memberOfSymbolsPerSlot+symbolstart time)+N*periodicity] modulo (1024*numberOfSlotsPerFrame*numberOfSymbolsPerSlot), for all N>=0, where SFNstart time, slotstart time, and symbolstart time represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively.

On DL, the UE may be configured with SPS per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS; and periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFNstart time+slotstart time)+N*periodicity*memberOfSlotsPerFrame/10] modulo (1024*numberOfSlotsPerFrame), where SFNstart time and slotstart time represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 9 and Table 10. Table 9 shows an example of special fields for DL SPS and UL grant Type 2 scheduling activation PDCCH validation, and Table 10 shows an example of special fields for DL SPS and UL grant Type 2 scheduling release PDCCH validation.

Figure 8:
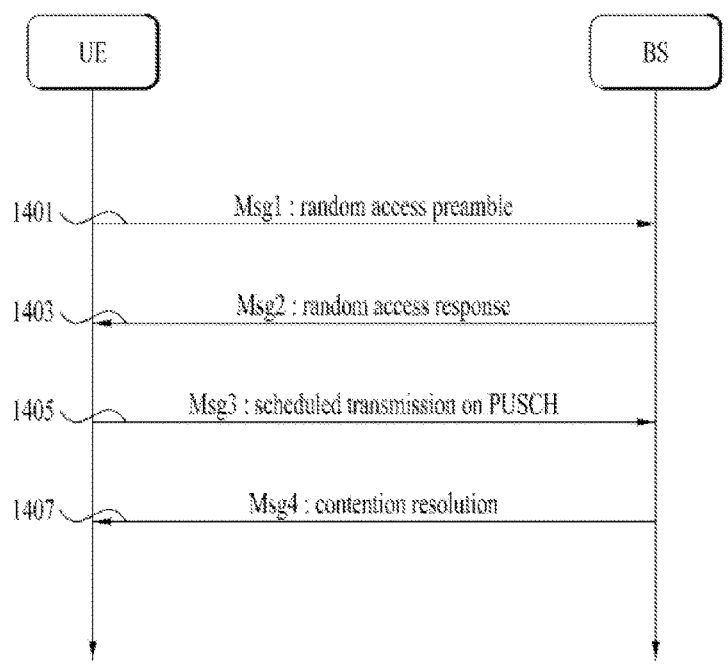
FIG. 8 is a diagram illustrating an example of a random access procedure to which various embodiments are applicable.
Figure 8:
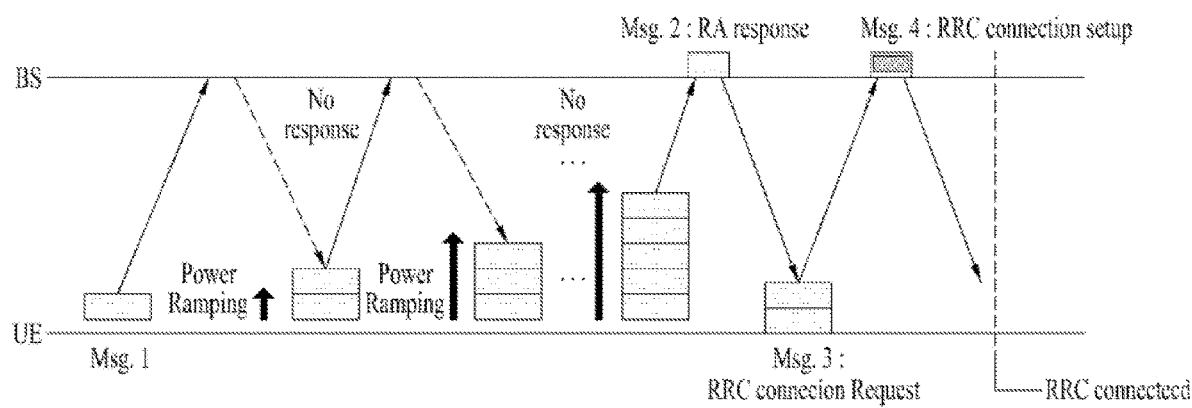

FIG. 8 is a diagram illustrating an example of a random access procedure to which various embodiments are applicable.

Referring to FIG. 8, When a (contention-based) RACH procedure is performed in four steps (4-step RACH procedure), the UE may transmit a message (Message 1 (Msg 1)) including a preamble related to a specific sequence on a PRACH (1401) and receive a PDCCH and an RAR message (Message 2 (Msg 2)) on a PDSCH corresponding to the PDCCH in response to the preamble (1403). The UE may transmit a message (Message 3 (Msg 3)) including a PUSCH by using scheduling information included in the RAR (1405) and perform a contention resolution procedure such as reception of a PDCCH signal and a PDSCH signal corresponding to the PDCCH signal. The UE may receive a message (Message 4 (Msg 4)) including contention resolution information for the contention resolution procedure from the BS (1407). The 4-step RACH procedure of the UE may be summarized in Table 5 below.

TABLE 5

| | Type of Signals | Operations/Information obtained |
|---|---|---|
| 1st step | PRACH preamble in UL | * Initial beam acquisition<br>* Random election of RA-preamble ID |
| 2nd Step | Random Access Response on DL-SCH | * Timing alignment information<br>* RA-preamble ID<br>* Initial UL grant, Temporary C-RNTI |
| 3rd Step | UL transmission on UL-SCH | * RCC connection request<br>* UE identifier |
| 4th Step | Contention Resolution on DL | * Temporary C-RNTI on PDCCH for initial access<br>* C-RNTI on PDCCH for UE in RRC_CONNECTED |

First, the UE may transmit an RACH preamble as Msg 1 on a PRACH in an RACH procedure.

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit an RACH preamble in RACH resources associated with the selected SSB.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information may include the preamble sequence transmitted by the UE, a cell RNTI (C-RNTI) that the BS has allocated to the UE attempting random access, UL transmit time alignment information, UL transmission power adjustment information, and UL radio resource allocation information. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

As described before, the UL grant included in the RAR schedules a PUSCH transmission for the UE. A PUSCH carrying an initial UL transmission based on the UL grant of the RAR is referred to as an Msg 3 PUSCH.

A (contention-based) RACH procedure performed in two steps, that is, a 2-step RACH procedure has been proposed to simplify the RACH procedure and thus achieve low signaling overhead and low latency In the 2-step RACH procedure, the operation of transmitting Msg 1 and the operation of transmitting Msg 3 in the 4-step RACH procedure may be incorporated into an operation of transmitting one message, Message A (Msg A) including a PRACH and a PUSCH by the UE. The operation of transmitting Msg 2 by the BS and the operation of transmitting Msg 4 by the BS in the 4-step RACH procedure may be incorporated into an operation of transmitting one message, Message B (Msg B) including an RAR and contention resolution information.

That is, in the 2-step RACH procedure, the UE may combine Msg 1 and Msg 3 of the 4-step RACH procedure into one message (e.g., Msg A) and transmit the message to the BS.

Further, in the 2-step RACH procedure, the BS may combine Msg 2 and Msg 4 of the 4-step RACH procedure into one message (e.g., Msg B) and transmit the message to the UE.

The 2-step RACH procedure may become a low-latency RACH procedure based on the combinations of these messages.

More specifically, Msg A may include a PRACH preamble included in Msg 1 and data included in Msg 3 in the 2-step RACH procedure. In the 2-step RACH procedure, Msg B may include an RAR included in Msg 2 and contention resolution information included in Msg 4.

Also, the contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives an RAR from the BS, the RACH procedure is completed.

In the contention-free RACH procedure, a CSI request field in an RAR UL grant indicates whether the UE is to include an aperiodic CSI report in a corresponding PUSCH transmission. An SCS for Msg 3 PUSCH transmission is provided by an RRC parameter. The UE may transmit the PRACH and the Msg 3 PUSCH on the same UL carrier of the same serving cell. A UL BWP for the Msg 3 PUSCH transmission is indicated by SIB1.

Non-Terrestrial Networks Reference

Figure 9:
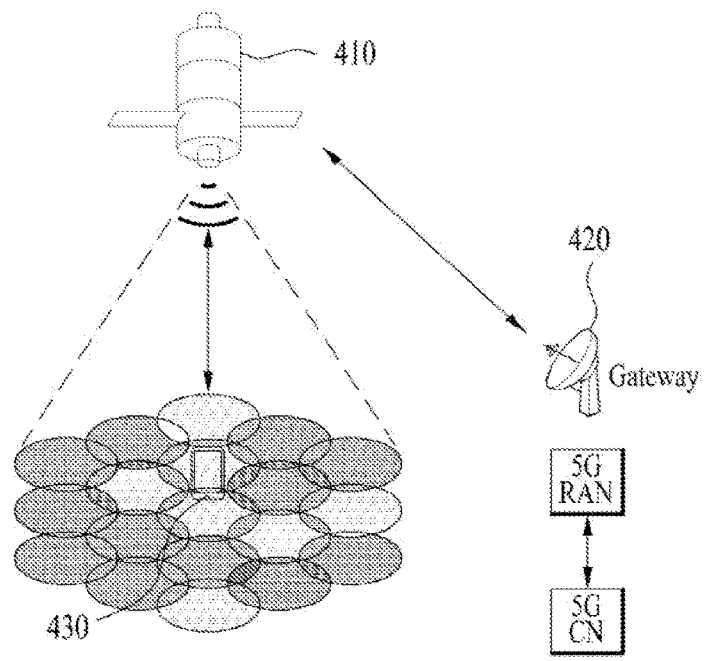
FIG. 9 illustrates a non-terrestrial network (NTN).
Figure 9:
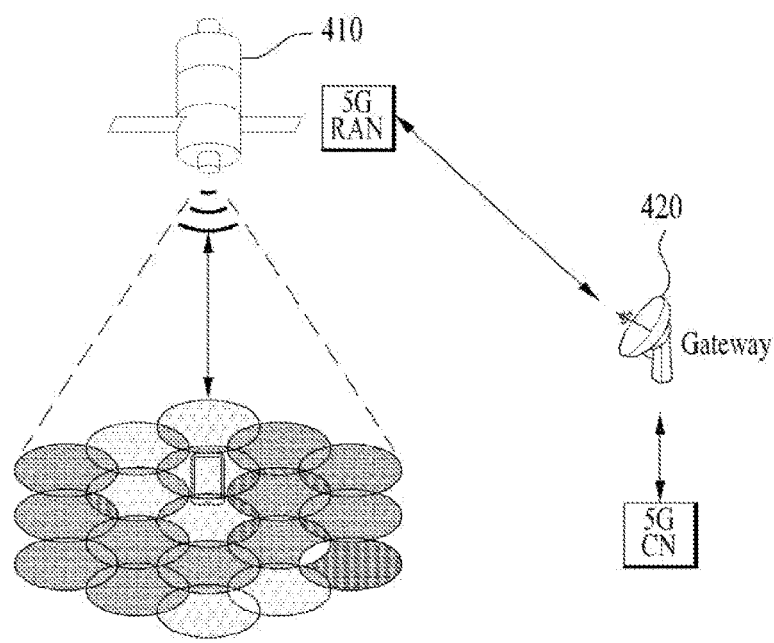

FIG. 9 illustrates a non-terrestrial network (NTN).

A non-terrestrial network (NTN) refers to a wireless network configured using satellites (e.g., geostationary earth orbit satellites (GEO)/low-earth orbit satellites (LEO)). Based on the NTN, coverage may be extended and a highly reliable network service may be provided. For example, the NTN may be configured alone, or may be combined with a conventional terrestrial network to configure a wireless communication system. For example, in the NTN network, i) a link between a satellite and a UE, ii) a link between satellites, iii) a link between a satellite and a gateway, and the like may be configured.

The following terms may be used to describe the configuration of a wireless communication system employing satellites.

Satellite: a space-borne vehicle embarking a bent pipe payload or a regenerative payload telecommunication transmitter, placed into Low-Earth Orbit (LEO) typically at an altitude between 500 km to 2000 km, Medium-Earth Orbit (MEO) typically at an altitude between 8000 to 20000 lm, or Geostationary satellite Earth Orbit (GEO) at 35 786 km altitude.

Satellite network: Network, or segments of network, using a space-borne vehicle to embark a transmission equipment relay node or base station.

Satellite RAT: a RAT defined to support at least one satellite.

5G Satellite RAT: a Satellite RAT defined as part of the New Radio.

5G satellite access network: 5G access network using at least one satellite.

Terrestrial: located at the surface of Earth.

Terrestrial network: Network, or segments of a network located at the surface of the Earth.

Use cases that may be provided by a communication system employing a satellite connection may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

For example, a 5G satellite access network may be connected to a 5G core Network. In this case, the satellite may be a bent pipe satellite or a regenerative satellite. The NR radio protocols may be used between the UE and the satellite. Also, F1 interface may be used between the satellite and the gNB.

As described above, a non-terrestrial network (NTN) refers to a wireless network configured using a device that is not fixed on the ground, such as satellite. A representative example is a satellite network. Based on the NTN, coverage may be extended and a highly reliable network service may be provided. For example, the NTN may be configured alone, or may be combined with an existing terrestrial network to configure a wireless communication system.

Use cases that may be provided by a communication system employing an NTN may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

Referring to FIG. 9, the NTN includes one or more satellites 410, one or more NTN gateways 420 capable of communicating with the satellites, and one or more UEs (/BSs) 430 capable of receiving mobile satellite services from the satellites. For simplicity, the description is focused on the example of the NTN including satellites, but is not intended to limit the scope of the present disclosure. Accordingly, the NTN may include not only the satellites, but also aerial vehicles (Unmanned Aircraft Systems (UAS) encompassing tethered UAS (TUA), Lighter than Air UAS (LTA), Heavier than Air UAS (HTA), all operating in altitudes typically between 8 and 50 km including High Altitude Platforms (HAPs)).

The satellite 410 is a space-borne vehicle equipped with a bent pipe payload or a regenerative payload telecommunication transmitter and may be located in a low earth orbit (LEO), a medium earth orbit (MEO), or a geostationary earth orbit (GEO). The NTN gateway 420 is an earth station or gateway existing on the surface of the earth, and provides sufficient RF power/sensitivity to access the satellite. The NTN gateway corresponds to a transport network layer (TNL) node.

The NTN may have i) a link between a satellite and a UE, ii) a link between satellites, iii) a link between a satellite and an NTN gateway. A service link refers to a radio link between a satellite and a UE. Inter-satellite links (ISLs) between satellites may be present when there are multiple satellites. A feeder link refers to a radio link between an NTN gateway and a satellite (or UAS platform). The gateway may be connected to a data network and may communicate with a satellite through the feeder link. The UE may communicate via the satellite and service link.

As NTN operation scenarios, two scenarios which are based on transparent payload and regenerative payload, respectively may be considered. FIG. 9-(a) shows an example of a scenario based on a transparent payload. In the scenario based on the transparent payload, the signal repeated by the payload is not changed. The satellites 410 repeat the NR-Uu radio interface from the feeder link to the service link (or vice versa), and the satellite radio interface (SRI) on the feeder link is NR-Uu. The NTN gateway 420 supports all functions necessary to transfer the signal of the NR-Uu interface. Also, different transparent satellites may be connected to the same gNB on the ground. FIG. 9-(b) shows an example of a scenario based on a regenerative payload. In the scenario based on the regenerative payload, the satellite 410 may perform some or all of the functions of a conventional BS (e.g., gNB), and may thus perform some or all of frequency conversion/demodulation/decoding/modulation. The service link between the UE and a satellite is established using the NR-Uu radio interface, and the feeder link between the NTN gateway and a satellite is established using the satellite radio interface (SRI). The SRI corresponds to a transport link between the NTN gateway and the satellite.

The UE 430 may be connected to 5GCN through an NTN-based NG-RAN and a conventional cellular NG-RAN simultaneously. Alternatively, the UE may be connected to the 5GCN via two or more NTNs (e.g., LEO NTN and GEO NTN, etc.) simultaneously.

Figure 10:
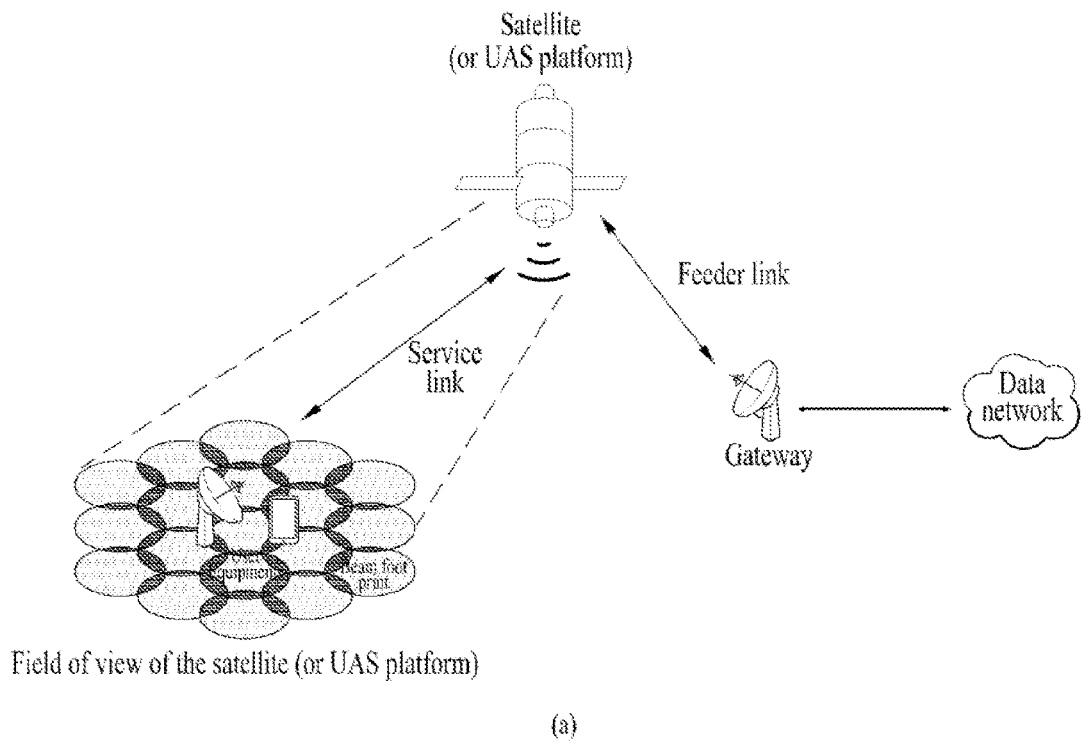
FIG. 10 illustrates an overview and a scenario of an NTN.
Figure 10:
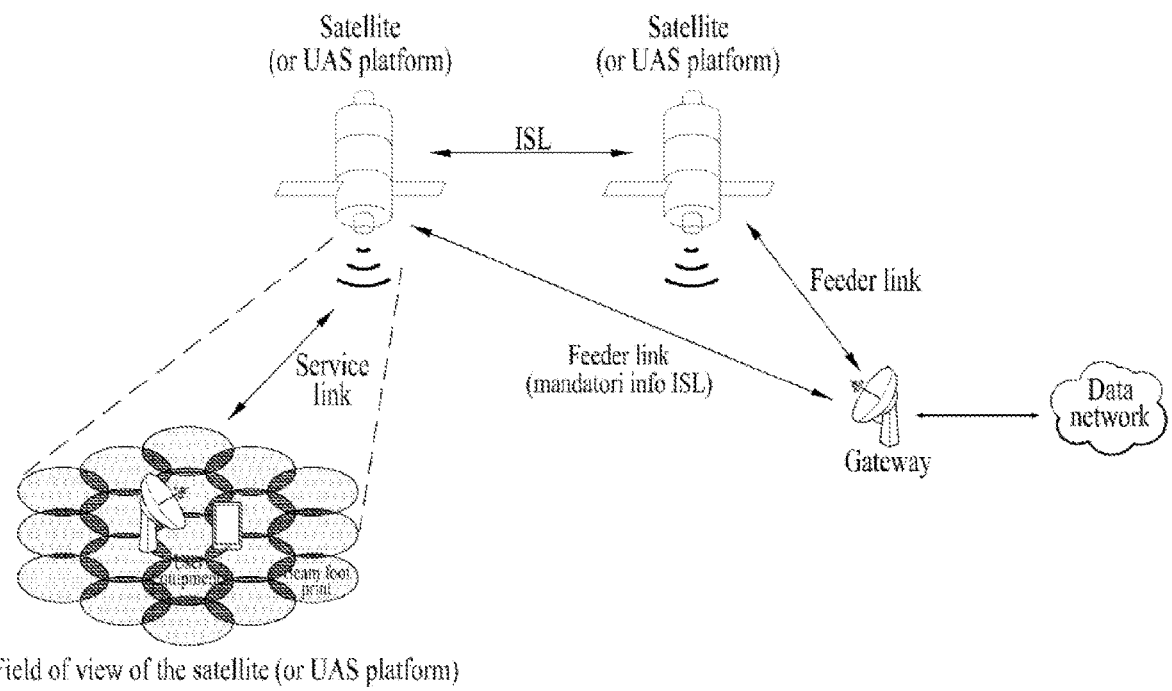

FIG. 10 illustrates an overview and a scenario of an NTN.

NTN refers to a network or network segment in which a satellite (or UAS platform) uses RF resources. Typical scenarios of the NTN providing access to a UE include an NTN scenario based on a transparent payload as shown in FIG. 10-(a) and an NTN scenario based on a regenerative payload as shown in FIG. 10-(b).

NTN typically features the following elements,

One or several sat-gateways that connect the Non-Terrestrial Network to a public data network A GEO satellite is fed by one or several sat-gateways which are deployed across the satellite targeted coverage (e.g. regional or even continental coverage). We assume that UE in a cell are served by only one sat-gateway.

A Non-GEO satellite served successively by one or several sat-gateways at a time. The system ensures service and feeder link continuity between the successive serving sat-gateways with sufficient time duration to proceed with mobility anchoring and hand-over.

A feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment is served by the satellite (or UAS platform) within the targeted service area.

Table 6 below defines various types of satellites (or UAS platforms).

TABLE 6

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | rotational station keeping position fixed fixed in terms of with | 200-3500 km |
| UAS plarform (including HAPS) | 8-50 km (20 km for HAPS) | elevation/azimuth with respect to a given earth point | 5-200 km |
| High Elliptical Orbit (HEO) satellite | 400-50000 km | Elliptical around the earth | 200-3500 km |

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links. HEO satellite systems are not considered in this document.

An NTN that provides access to a terminal in six reference scenarios described below can be considered.

Circular orbiting and notional station keeping platforms.
Highest RTD constraint
Highest Doppler constraint
A transparent and a regenerative payload
One ISL case and one without ISL. Regenerative payload is mandatory in the case of inter-satellite links.

Fixed or steerable beams resulting respectively in moving or fixed beam foot print on the ground Six scenarios are considered as depicted in Table 7 and are detailed in Table 8.

TABLE 7

| | Transparent satellite | Regenerative satellite |
|---|---|---|
| GEO based non-terrestrial access network: | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 8

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e g. 2 GHz)<br>>6 GHz (e g. DL 20 GHz, UL 30 GHz) | |
| Max channel bandwidth capability (service link) | 30 MHz for band <6 GHz<br>1 GHz for band >6 GHz | |
| Payload | Scenario A : Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No (the beams move with the satellite)<br>Scenario D 1: Yes (steerable beams), see note 1<br>Scenario D 2: No (the beams move with the satellite) |
| Max beam foot print size (edge to edge) regardless of the elevation angle | 3500 km (Note 5) | 1000 km |

TABLE 8-continued

| Scenarios | GEO based non-terrestrial access network (Scenario A and B) | LEO based non-terrestrial access network (Scenario C & D) |
|---|---|---|
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude) 3,131 km (1,200 km altitude) |
| Max Round Trip Delay (propagation delay only) | Scenario A: 541.46 ms (service and feeder links) Scenario B: 270.73 ms (service link only) | Scenario C: (transparent payload: service and feeder links) 25.77 ms (600 km) 41.77 ms (1200 km) Scenario D: (regenerative payload: service link only) 12.89 ms (600 km) 20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km) 21 ppm (1200 km) |
| Max Doppler shift variation (earth fixed user equipment) | 0.000 045 ppm/s | 0.27 ppm/s (600 km) 0.13 ppm/s (1200 km) |
| User equipment motion on the earth | 1200 km/h (e.g. aircraft) | 500 km/h (e.g. high speed train) Possibly 1200 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 20 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1: Each satellite has the capability to steer beams towards fixed points on earth using beamforming techniques. This is applicable for a period of time corresponding to the visibility time of the satellite NOTE 2: Max delay variation within a beam (earth fixed user equipment) is calculated based on Min Elevation angle for both gateway and user equipment NOTE 3: Max differential delay within a beam is calculated based on Max beam foot print diameter at nadir NOTE 4: Speed of light used for delay calculation is 299792458 m/s.

NOTE 5: The Maximum beam foot print size for GEO is based on current state of the art GEO High Throughput systems, assuming either spot beams at the edge of coverage (low elevation).

NOTE 6: The maximum differential delay at cell level has been computed considering the one at beam level for largest beam size. It doesn't preclude that cell may include more than one beam when beam size are small or medium size. However the cumulated differential delay of all beams within a cell will not exceed the maximum differential delay at cell level in the table above.

The NTN study results apply to GEO scenarios as well as all NGSO scenarios with circular orbit at altitude greater than or equal to 600 km.

Hereinafter, the NTN reference point will be described.

Figure 11:
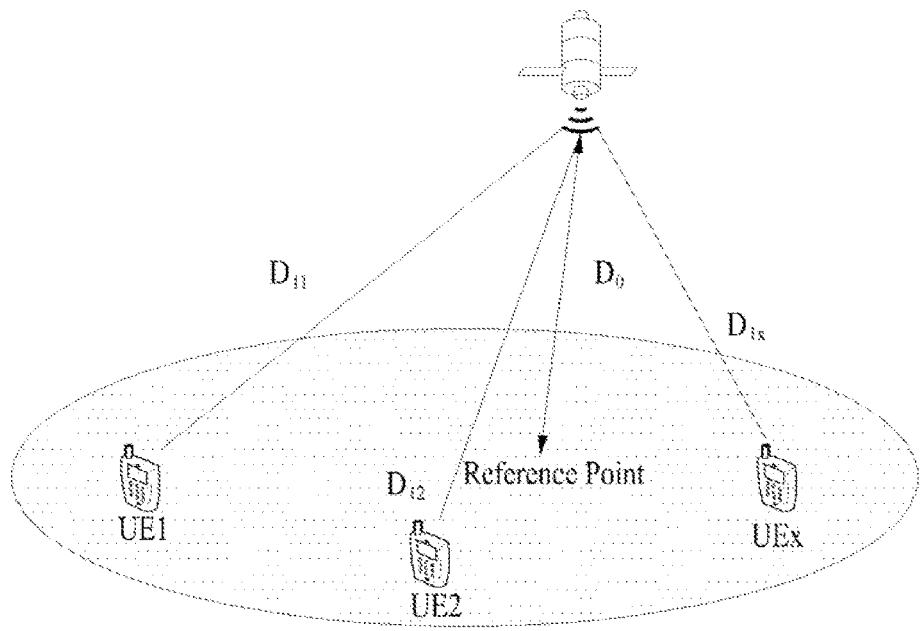
FIG. 11 illustrates TA components of the NTN.
Figure 11:
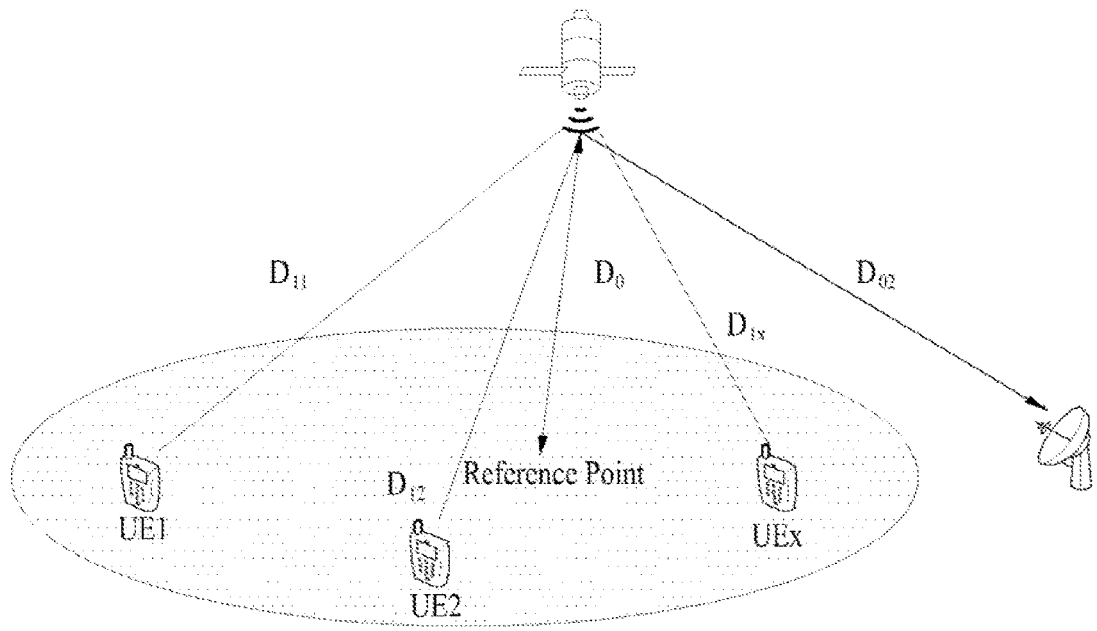

FIG. 11 illustrates TA components of the NTN. Here, the TA offset (NTAoffset) may not be plotted.

With consideration on the larger cell coverage, long round trip time (RTT) and high Doppler, enhancements are considered to ensure the performance for timing and frequency synchronization for UL transmission.

Referring to FIG. 11, a reference point related to timing advance (TA) of initial access and subsequent TA maintenance/management is illustrated. Terms defined in relation to FIG. 11 are described below.

Option 1: Autonomous acquisition of the TA at UE with UE known location and satellite ephemeris.

Regarding option 1, the required TA value for UL transmission including PRACH can be calculated by the UE. The corresponding adjustment can be done, either with UE-specific differential TA or full TA (consisting of UE specific differential TA and common TA).

W.r.t the full TA compensation at the UE side, both the alignment on the UL timing among UEs and DL and UL frame timing at network side can be achieved. However, in case of satellite with transparent payload, further discussion on how to handle the impact introduced by feeder link will be conducted in normative work. Additional needs for the network to manage the timing offset between the DL and UL frame timing can be considered, if impacts introduced by feeder link is not compensated by UE in corresponding compensation.

W.r.t the UE specific differential TA only, additional indication on a single reference point should be signalled to UEs per beam/cell for achieving the UL timing alignment among UEs within the coverage of the same beam/cell. Timing offset between DL and UL frame timing at the network side should also be managed by the network regardless of the satellite payload type.

With concern on the accuracy on the self-calculated TA value at the UE side, additional TA signalling from network to UE for TA refinement, e.g., during initial access and/or TA maintenance, can be determined in the normative work.

Option 2: Timing advanced adjustment based on network indication

Regarding option 2, the common TA, which refers to the common component of propagation delay shared by all UEs within the coverage of same satellite beam/cell, is broadcasted by the network per satellite beam/cell. The calculation of this common TA is conducted by the network with assumption on at least a single reference point per satellite beam/cell.

The indication for UE-specific differential TA from network as the Rel-15 TA mechanism is also needed. For satisfying the larger coverage of NTN, extension of value range for TA indication in RAR, either explicitly or implicitly, is identified. Whether to support negative TA value in corresponding indication will be determined in the normative phase. Moreover, indication of timing drift rate, from the network to UE, is also supported to enable the TA adjustment at UE side.

For calculation of common TA in the above two options, single reference point per beam is considered as the baseline. Whether and how to support the multiple reference points can be further discussed in the normative work.

For the UL frequency compensation, at least for LEO system, the following solutions are identified with consideration on the beam specific post-compensation of common frequency offset at the network side:

Regarding option 1, both the estimation and pre-compensation of UE-specific frequency offset are conducted at the UE side. The acquisition of this value can be done by utilizing DL reference signals, UE location and satellite ephemeris.

Regarding option 2, the required frequency offset for UL frequency compensation at least in LEO systems is indicated by the network to UE. The acquisition on this value can be done at the network side with detection of UL signals, e.g., preamble.

Indication of compensated frequency offset values by the network is also supported in case that compensation of the frequency offset is conducted by the network in the uplink and/or the downlink respectively. However, indication of Doppler drift rate is not necessary.

Hereinafter, more delay-tolerant re-transmission mechanisms will be described in detail.

As follows, two main aspects of a retransmission mechanism with improved delay
  tolerance can be discussed.
  Disabling of HARQ in NR NTN
  HARQ optimization in NR-NTN HARQ Round Trip Time in NR is of the order of several ms. The propagation delays in NTN are much longer, ranging from several milliseconds to hundreds of milliseconds depending on the satellite orbit. The HARQ RTT can be much longer in NTN. It was identified early in the study phase that there would be a need to discuss potential impact and solutions on HARQ procedure. RAN1 has focused on physical layer aspects while RAN2 has focused on MAC layer aspects.

In this regard, disabling of HARQ in NR NTN may be considered.

It was discussed that when UL HARQ feedback is disabled, there could be issues if (i) MAC CE and RRC signalling are not received by UE, or (ii) DL packets not correctly received by UE for a long period of time without gNB knowing it.

The following were discussed without convergence on the necessity of introducing such solutions for NTN when HARQ feedback is disabled (1) Indicate HARQ disabling via DCI in new/re-interpreted field (2) New UCI feedback for reporting DL transmission disruption and or requesting DL scheduling changes The following possible enhancements for slot-aggregation or blind repetitions were considered. There is no convergence on the necessity of introducing such enhancements for NTN.

(1) Greater than 8 slot-aggregation
(2) Time-interleaved slot aggregation
(3) New MCS table Next, a method for optimizing HARQ for the NR NTN will be described.

Solutions to avoid reduction in peak data rates in NTN were discussed. One solution is to increase the number of HARQ processes to match the longer satellite round trip delay to avoid stop-and-wait in HARQ procedure. Another solution is to disable UL HARQ feedback to avoid stop-and-wait in HARQ procedure and rely on RLC ARQ for reliability. The throughput performance for both types of solutions was evaluated at link level and system level by several contributing companies.

The observations from the evaluations performed on the effect of the number of HARQ processes on performance are summarized as follows:

Three sources provided link-level simulations of throughput versus SNR with the following observations:

One source simulated with a TDL-D suburban channel with elevation angle of 30 degrees with BLER target of 1% for RLC ARQ with 16 HARQ processes, and BLER targets 1% and 10% with 32/64/128/256 HARQ processes. There was no observable gain in throughput with increased number of HARQ processes compared to RLC layer re-transmission with RTT in {32, 64, 128, 256} ms.

One source simulated with a TDL-D suburban channel with elevation angle of 30 degrees with BLER targets of 0.1% for RLC ARQ with 16 HARQ processes, and BLER targets 1% and 10% with 32 HARQ processes. An average throughput gain of 10% was observed with 32 HARQ processes compared to RLC ARQ with 16 HARQ processes with RTT=32 ms.

One source provides the simulation results in following cases with RTT=32 ms, e.g., assuming BLER targets at 1% for RLC ARQ with 16 HARQ processes, BLER targets 1% and 10% with 32 HARQ processes. There is no observable gain in throughput with 32 HARQ processes compared to RLC ARQ with 16 HARQ processes in case that channel is assumed as TDL-D with delay spread/K-factor taken from system channel model in suburban scenario with elevation angle 30. Performance gain can be observed with other channels, especially, up to 12.5% spectral efficiency gain is achieved in case that channel is assumed as TDL-A in suburban with 30° elevation angle. Moreover, simulation based on the simulation with consideration on other scheduling operations: (i) additional MCS offset, (ii) MCS table based on lower efficiency (iii) slot aggregation with different BLER targets are conducted. Significant gain can be observed with enlarging the HARQ process number.

One source provided system level simulations for LEO=1200 km with 20% resource utilization, 16 and 32 HARQ processes, 15 and 20 UEs per cell, proportional fair scheduling, and no frequency re-use. The spectral efficiency gain per user with 32 HARQ processes compared to 16 HARQ processes depends on the number of UEs. With 15 UEs per beam, an average spectral efficiency gain of 12% at 50% per centile is observed. With 20 UEs per cell there is no observable gain.

The following options were considered with no convergence on which option to choose:

Option A: Keep 16 HARQ process IDs and rely on RLC ARQ for HARQ processes with UL HARQ feedback disabled via RRC Option B: Greater than 16 HARQ process IDs with UL HARQ feedback enabled via RRC with following consideration. In this case, in the case of 16 or more HARQ process IDs, maintenance of a 4-bit HARQ process ID field in UE capability and DCI may be considered.

Alternatively, the following solutions may be considered for 16 or more HARQ processes keeping the 4-bit HARQ process ID field in DCI:

Option A: Keep 16 HARQ process IDs and rely on RLC ARQ for HARQ processes with UL HARQ feedback disabled via RRC Option B: Greater than 16 HARQ process IDs with UL HARQ feedback enabled via RRC with following consideration. In this case, in the case of 16 or more HARQ process IDs, maintenance of a 4-bit HARQ process ID field in UE capability and DCI may be considered.

Alternatively, the following solutions may be considered for 16 or more HARQ processes keeping the 4-bit HARQ process ID field in DCI:

Slot number based

Virtual process ID based with HARQ re-transmission timing restrictions

Reuse HARQ process ID within RTD (time window)

Re-interpretation of existing DCI fields with assistance information from higher layers One source also considered solutions where the HARQ process ID field is increased beyond 4 bits With regards to HARQ enhancements for soft buffer management and stop-and-wait time reduction, the following options were considered with no convergence on which, if any, of the options, to choose:

Option A-1: Pre-active/pre-emptive HARQ to reduce stop-and-wait time

Option A-2: Enabling/disabling of HARQ buffer usage configurable on a per UE and per HARQ process Option A-3: HARQ buffer status report from the UE The number of HARQ processes with additional considerations for HARQ feedback, HARQ buffer size, RLC feedback, and RLC ARQ buffer size should be discussed further when specifications are developed.

The configurations (NR frame structure, NTN system, etc.) discussed above may be combined and applied in the contents described below, or may be supplemented to clarify the technical features of the methods proposed in the present disclosure. In addition, methods related to HARQ disabling, which will be described later, are related to UL transmission and may be equally applied to the DL signal transmission method in the NR system or LTE system described above. It is to be noted that terms, expressions, structures, and the like defined in each system may be appropriately modified or replaced so that the technical idea proposed in this specification can be implemented in the corresponding system.

Signaling Method for Timing Relationship in NTN

Regarding signaling of the timing relationship of the NTN, the following scenarios may be considered.

By introducing the K offset (K_offset) in NTN, the following timing relationship may be improved. Specifically, the timing relationship among 1) DCI scheduled PUSCH transmission timing (including CSI on the PUSCH), 2) RAR grant scheduled PUSCH transmission timing, 3) HARQ-ACK transmission timing on the PUCCH, 4) CSI reference resource timing, 5) aperiodic SRS transmission timing, and the like may be improved. Additional timing relationships that require K_offset of the same or different values can be further identified.

In the case of K_offset used for initial access, information of K_offset may be transmitted through system information. For example, information of K_offset may be explicitly and/or implicitly delivered through the system information. A cell-specific K_offset value used in all beams of the cell and/or each beam of the cell may use a beam-specific K_offset value. Whether to update the K_offset after the access and the update method may be discussed later.

In addition, in order to improve the timing relationship of HARQ-ACK for PUCCH for MsgB, K_offset (which may or may not be equal to the value of K_offset in another timing relationship) may be introduced. A scenario related to introducing K_offset into the transmission timing of the RAR grant scheduled PUSCH may also be applied to the fallbackRAR scheduled PUSCH.

In addition, K_mac may be defined as a scheduling offset other than K_offset. First, when DL and UL frame timings are aligned in the gNB, K_mac may not be required for the operation and assumption of the UE for a DL configuration indicated by the MAC-CE instruction on the PDSCH. Alternatively, K_mac may not be required for the operation and assumption of the UE for a UL configuration indicated by the MAC-CE instruction on the PDSCH. Second, when the DL and UL frame timings are not aligned in the gNB, K_mac may be required for the operation and assumption of the UE for the DL configuration indicated by the MAC-CE instruction on the PDSCH. Alternatively, K_mac may not be required for the operation and assumption of the UE for the UL configuration indicated by the MAC-CE instruction on the PDSCH. This does not preclude identifying exceptional MAC CE timing relationship(s) that may or may not require K_mac.

Figure 12:
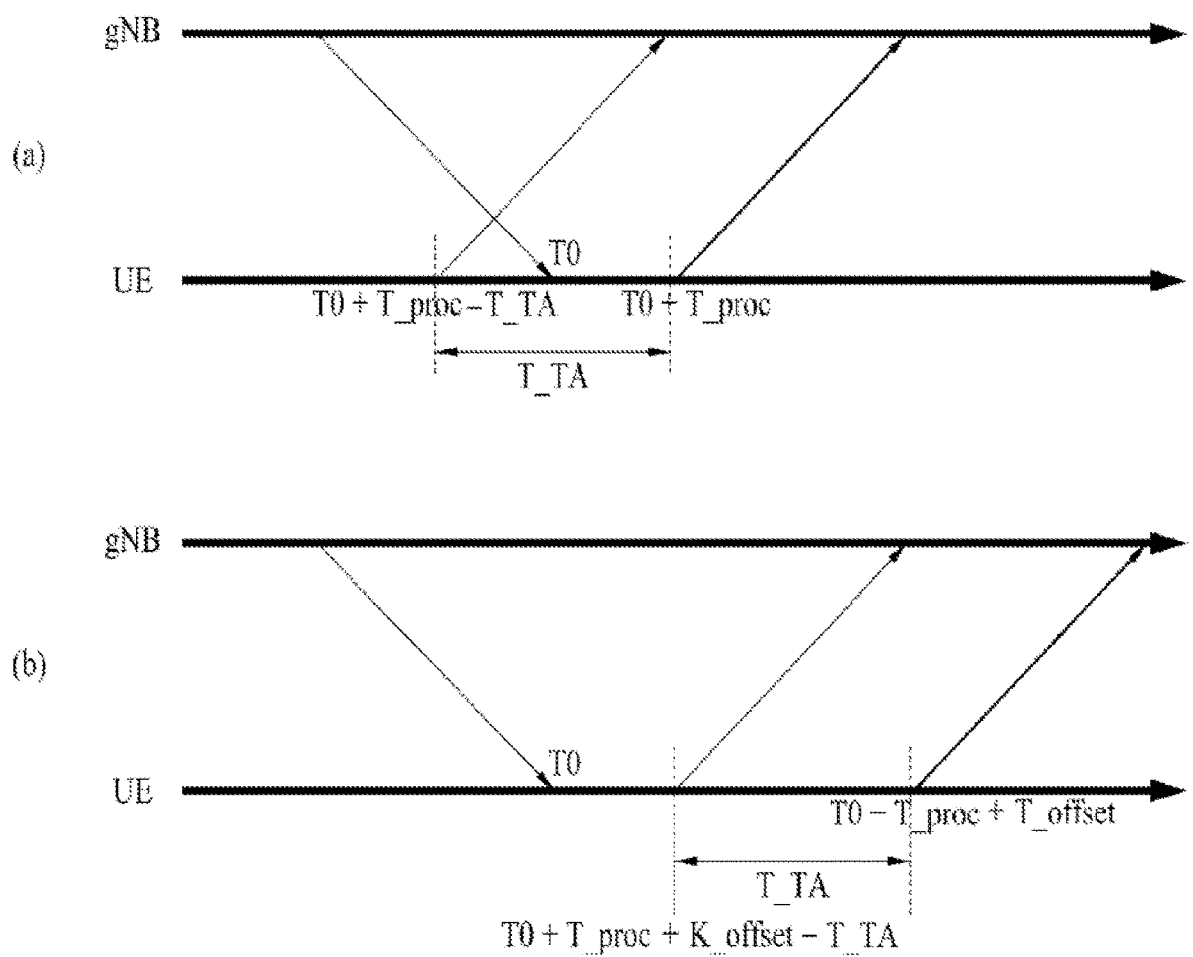
FIG. 12 illustrates a K offset configured for a UE.

FIG. 12 illustrates a K offset configured for a UE.

Referring to FIG. 12-(a), regarding K_offset, the BS (or gNB) may provide an instruction for UL transmission on the PDCCH. In this case, the UE may receive the PDCCH at time T0, and may perform the corresponding UL transmission at T0+T_proc. Here, T_proc may be a processing time and/or a time including a scheduling offset. In this case, in order to transmit a UL signal at the UL Rx timing expected by the BS, the UE may perform UL transmission by applying the timing advance (TA). The UL transmission time may be a first transmission time (T0+T_proc−T_TA) as shown in FIG. 12-(a). In a system with a long round trip time (RTT) such as the NTN, the first transmission time (T0+T_proc−T_TA) may come from hind T0 (that is, the first transmission time may precede T0). In this case, ambiguity may arise as the UE must transmit the UL signal before receiving the PDCCH. To resolve this ambiguity, K_offset may be introduced as shown in FIG. 12-(b). For example, through the appropriate setting of the K_offset, the UL transmission time (T0+T_proc+T_offset−T_TA) may be pushed back from the PDCCH reception time T0, and the ambiguity of the operation of the UL transmission of the UE may be resolved In the scenario above, the K_offset is introduced in consideration of the aforementioned issue, and the value of K_offset may be broadcast through system information such that the UE may perform initial access for accessing the cell (or NTN cell). Here, the value of K_offset may be cell-specifically or beam-specifically set as follows. Here, the beam may be an (analog) beam corresponding to a specific SSB or CSI-RS.

The cell-specific (or cell-specifically set) K_offset is a value of the K_offset representing one cell that is broadcast to all UEs in the cell through system information. All UEs in the cell may perform initial access based on the broadcast cell-specific K_offset. This cell-specific K_offset causes smaller signaling overhead and less specification impact than the beam-specific offset. On the other hand, the beam-specific case (or beam-specific K_offset configured to be beam-specific) may mean that, when there are multiple beams (corresponding to SSB or CSI-RS) in one cell, K_offset is signaled for each of the beams. Such a beam-specific K_offset has an advantage in that K_offset may be configured with a fine granularity for the UEs in the NTN cell (with large cell coverage) (a cell having considerable cell coverage).

Hereinafter, proposals 1 to 4 for a range and/or target in which the K_offset may be efficiently set will be described based on the above-described scenario.

(1) Proposal 1—Configuring K_Offset for Each Beam Group

In order to reduce signaling overhead, the initial configuration and update of the K_offset may be configured and/or indicated for each beam group. As described above, cell-specific and beam-specific cases are advantageous in terms of signaling overhead and fine granularity, respectively. As a compromise of the above proposal, it may be advantageous to have a finer granularity than the cell-specific K_offset, while enduring signaling overhead to some extent. As a method of indicating such a beam group specific K_offset, the following options may be considered. Here, the beam group may be a group of specific (analog) beamformed SSB/CSI-RSs or a group of beam directions within a specific range.

The specific K_offset for each beam group (or beam group specific offset) may be configured/indicated through system information (SIB). In this case, information on the beam group may be predetermined (according to predefined rule) or may be indicated/configured through the system information together with the beam group specific offset. In this case, the UE may use the beam group specific K_offset from the initial access step. For example, when information on the beam group is indicated or configured according to the predefined rule, $2^N$ SSB/CSI-RSs from the start id (e.g., id=0, or lowest id) may be configured as one group and SSB/CSI-RSs with id from $2^N$ to $2*2^N-1$ may be configured as another group according to a predefined rule.

The specific K_offset for each of the groups may be indicated or configured according to at least one of the following conditions i) to iv).

i) The largest value or the smallest value among the multiple values of the beam-group specific K_offset may be considered as a cell-specific K_offset. ii) In order to minimize signaling overhead, the largest value or the smallest value among the multiple values of the beam-group specific K_offset may be assumed to be a reference value, and the remaining values of the beam-group specific K_offset may be configured/indicated by a difference from the reference value. In this case, a payload for configuring/indicating the beam group specific K_offset based on the difference may be predetermined, or information on the size, range and/or step size of the payload may be indicated/configured together for flexibility. iii) The value of the beam-group specific K_offset may be indicated by an absolute time (e.g., in msec). iv) The value of the beam-group specific K_offset may be indicated through an NTN specific SIB.

Alternatively, the beam-group specific K_offsets may be indicated/configured by a channel/signal other than the channel related to the SIB for configuring the cell-specific K_offset representing the cell. For example, in order to reduce signaling overhead of the SIB, the UE may use a cell-specific K_offset in the initial access step, and then use a beam-group specific K_offset through RRC or MAC-CE. That is, a beam-group specific K_offset, which is a finer K_offset, may be indicated through the RRC or MAC-CE. Alternatively, in order to reduce signaling overhead, a cell-specific K_offset may be considered as a reference value, and the beam-group specific K_offset may be indicated as a difference from the reference value. In this case, a payload for configuring/indicating the beam group specific K_offset based on the difference may be predetermined, or information on the size, range and/or step size of the payload may be indicated/configured together for flexibility.

Alternatively, the value of the beam-group specific K_offset may be indicated as an absolute time (e.g., in msec). Alternatively, the initial beam-group K_offset in the RRC connected mode may be configured/indicated through RRC (e.g., UE dedicated RRC), and update of the initial beam-group K_offset may be indicated/configured through the MAC-CE and/or DCI (e.g., group-common DCI). When the update is configured/indicated, information on the change of the beam-group may be additionally provided. Here, the change of the beam-group may mean a change of the value of N related to the aforementioned grouping or a change of a beam-group ID.

As such, according to Proposal 1 discussed above, by configuring a beam group specific K_offset, K offsets may be configured with a fine granularity, and signaling overhead may be reduced.

(2) Proposal 2

The update of the K_offset may be explicitly indicated/configured by the BS or may be implicitly indicated/configured through other parameters/signals.

When explicitly indicating/configuring the update, the BS may periodically/semi-persistently indicate the update through the RRC or MAC-CE (e.g., through a time periodicity or time offset) or may aperiodically configure/indicate the update. For example, in the case of the semi-permanent update configuration, activation/deactivation of the update may be indicated/configured through the MAC-CE.

Alternatively, when the BS aperiodically configures/indicates the update, the update of the K_offset may be performed based on a triggering method by the BS and a UE requested (triggered) method.

For example, in the method of triggering by the BS, the BS may use a counter based on a specific event. When the value of the counter is greater than or equal to a specific value, the BS may trigger the update of the K-offset. Here, the specific event may be a case where a response (e.g., ACK-NACK information) to a specific UL signal indicated by the BS is not received within a time/window expected by the BS. In this case, the BS may count the count value of the counter (e.g., the backoff counter may decrease the counter value by 1, and the counter may increase the count value by 1).

Alternatively, in the UE requested (or triggered) case, the UE may trigger the update of the K_offset by signaling a request for update of the K_offset or by reporting a TA value. For example, the BS may provide a configuration/indication for the update of the K_offset when the reported TA value is greater than a predetermined value of the K_offset or greater (or less) than or equal to a specific threshold. The TA value may be a UE-specific TA or full TA (UE specific TA+common TA). The UE-specific TA may be autonomously acquired/calculated by the UE based on the GNSS, and the common TA may be signaled/configured by the BS. A triggering condition for a case where the UE requests the K_offset may be that the difference between the K_offset implicitly calculated by the UE and a preset K_offset is large (e.g., the difference is greater than or equal to a preset threshold), or is less than the UE-specific TA (or full TA). Alternatively, the UE may report a recommended value of K_offset to the BS, and the BS may configure/indicate the K_offset (or configure/indicate the update of the K_offset) based on the recommended value of K offset.

The new K_offset (or the updated K_offset) may be applied at the reception time n (where n may be a slot or symbol) of the signal/channel indicating the K_offset, or may be applied after the applied offset. For example, the time when the new K_offset is applied may be a time obtained by adding the applied offset (which may be configured in units of symbols, slots, or msec) to the reception time n of the signal/channel. Alternatively, when the UE transmits the TA value or the recommended K offset as described above, the time when the new K offset is applied may be equal to the transmission time m+a*TA or m+a*K_offset (where a is a scaling value). However, when the BS misses or fails to detect the value (the TA value or the recommended value of K_offset), ambiguity may occur due to a difference in understanding between the BS and the UE. In order to resolve such ambiguity, the BS may transmit, to the UE, ACK information informing the UE that the TA value or the value of K_offset (e.g., the TA value or the recommended value of K_offset reported by the UE) has been received, and the UE may apply the new K_offset after a time n+K has elapsed from n (where n is the reception time of the ACK and K can be symbols, slots or msec).

Alternatively, (periodic) satellite orbit information (ephemeris information, hereinafter orbit information) may be broadcast in relation to the method of triggering the update of the K_offset by the BS. The orbit information may be configured/updated through SIB. Alternatively, the initial orbit information may be indicated through the SIB and updated orbit information may be indicated through RRC or the like. That is, the information of the K_offset may be updated every time the orbit information is updated. When the indication of the K_offset is indicated through the same channel/signal as the orbit information or through a different channel/signal, the UE may expect to receive an indication for the update of the orbit information within a specific time window W from the reception time of the update of K_offset to X.

In a related scenario, the update of the K_offset may be indicated/configured by at least one of RRC reconfiguration and MAC CE. Regarding the above scenario, when the update of the K_offset is performed by the RRC reconfiguration or MAC CE, the application time of the updated new K_offset may be ambiguous. In order to resolve this ambiguity, the following options 1), 2) and/or 3) may be considered.

1) When the value of K_offset is updated by RRC reconfiguration, the time when the new K_offset is applied may be X slots (or X symbols or X msec) later than the transmission time of the RRC reconfiguration complete message (e.g., slot n). Alternatively, when the value of K_offset is updated by the RRC reconfiguration, the time when the new K_offset is applied may be X slots (or X symbols or X msec) later than the reception time (e.g., slot n) of the RRC reconfiguration complete message of the BS.

2) When the value of K_offset is updated by the MAC CE, the time when the updated value of K_offset (or the new K_offset) is applied may be X slots (or X symbols or X msec) later than the transmission time (e.g., slot n) of an ACK for successful reception of the MAC-CE indicating the update of the value of K_offset. Alternatively, the value of K_offset is updated by the MAC CE, the time when the updated value of K_offset (or the new K_offset) is applied may be X slots (or X symbols or X msec) later than the time (e.g., slot n) when the BS receives an ACK for successful reception of the MAC-CE indicating the value of K_offset of the UE. The K_offset used in sending the ACK may be the value before the change.

3) X in options 1) and 2) may be determined based on the capability of the UE or may be set by the BS. X can be a non-negative integer value. X can be zero.

Alternatively, the updated value of the new K_offset may be applied based on the reception time of the corresponding RRC reconfiguration or the reception time (e.g., slot m) of the MAC-CE.

Specifically, when the value of K_offset is updated by RRC reconfiguration, the time when the new value of K_offset is applied may be X slots (or X symbols or X msec) later than the time (e.g., slot m) when the RRC reconfiguration is received (Example 1). Alternatively, when the value of K_offset is updated by the MAC CE, the time when the new value of K_offset is applied may be X slots (or X symbols or X msec) later than the time (e.g., slot m) when the MAC-CE indicating the value of K_offset (Example 2). In this case, when the ACK transmission time is within the application time m+X, the ACK is transmitted by applying the value of K_offset given before the update. When the ACK transmission time is later than the application time m+X, the ACK may be transmitted by applying the updated new value of K_offset. Here, in Examples 1 and 2, X may be determined based on the capability of the UE or may be set by the BS. X can be a non-negative value. X can be zero. Alternatively, when update information is indicated by MAC-CE, the UE may transmit a NACK when it misses to detect or fails to receive (or transmit) the MAC-CE information (Example 3). In this case, the BS may undergo ambiguity in determining whether the K_offset applied to the NACK information is a value before or after the update. The BS may detect the value of K_offset applied to the NACK by performing detection twice on the two time points (the values of K_offset before and after the update).

Alternatively, when the RRC reconfiguration or MAC-CE-based (UE-specific) K_offset update is performed, the BS may miss an ACK for the RRC reconfiguration complete message or MAC-CE reception. In this case, an error may occur in the operations of the BS and the UE. In order to prevent such an error, the BS may additionally transmit a confirmation message for reception of an ACK for the RRC reconfiguration complete message or the MAC-CE. The UE may apply the updated value of K_offset at a time X slots (or X symbols or X msec) later than the time (e.g., slot n) when the confirmation message is received. Alternatively, when the UE operates the K_offset update based on the reception time, the ambiguity between the BS and the UE may be resolved by the implementation of the BS (e.g., two blind detections) even if the RRC reconfiguration or MAC-CE reception fails, Hereinafter, an operation related to the combination of RRC reconfiguration and MAC-CE will be described in detail.

Updating K_offset using RRC reconfiguration is mainly suitable for the GEO scenario. This is because the distance between the UE and the satellite (GEO satellite) is very long (e.g., 35000 km away from each other) and the satellite is a geostationary orbit satellite that appears to be stationary in view of the UE. In this case, since the value variation of K_offset is not large compared to that in the LEO scenario (communication with the LEO satellite), fast timing adjustment is not required, and accordingly it may be more appropriate to use the RRC reconfiguration. Therefore, application of the RRC reconfiguration may be limited to the GEO scenario. Alternatively, in the case of the NTN, the satellite type (NTN platform type) may not be explicitly configured, and accordingly the UE may indirectly estimate the NTN platform type based on the orbit information indicated through the SIB. The UE may determine the satellite type based on the estimated information. In the GEO scenario, the UE may determine that only the (UE-specific) K_offset given by the RRC reconfiguration is valid. In this case, the UE may ignore the value of (UE-specific) K_offset indicated through the MAC-CE, or may not expect the value of K_offset or the update to be indicated through the MAC-CE. Here, the updated (UE-specific) K_offset may be indicated as a differential from the cell-specific K_offset indicated by the system information.

Alternatively, when the value or update of the K_offset is indicated through both the RRC reconfiguration and the MAC-CE, the differential based on the RRC reconfiguration value may be indicated for the indication of the update using the MAC-CE. In this case, the UE may update the value of K_offset using the accumulated value of the corresponding value (the accumulated value of the differential).

The configuration of K_mac may be additionally introduced in relation to the NTN. A method for operating K_mac and K_offset will be described in detail below.

In this regard, the unit of K_offset may be the number of slots for a given subcarrier spacing (SCS), and the unit of K_mac may be the number of slots for a given SCS. One subcarrier spacing value or different subcarrier spacing may be configured for the NTN-related different scenarios (e.g., GEO scenario, LEO scenario, etc.).

Specifically, the K_offset and/or K_mac may have a different range of values and given (employed) SCS according to a satellite scenario (e.g., GEO scenario, LEO scenario, etc.) or satellite (NTN platform) type. Here, the satellite scenario may include LEO earth-moving beam, LEO earth-fixed beam, GEO, HAPs, and ATG (see Tables 7 and 8).

Alternatively, K_offset and/or K_mac value may have one value for all the above-described satellite scenarios or satellite (NTN platform) types, or have a separate range of values and/or SCS configured for each satellite scenario or satellite (NTN platform) type.

Alternatively, the range of K_offset and/or the K_mac may be configured for each FR (or one representative value in the range may be configured for each FR). In other words, considering that different bands are used for the respective scenario, the range of K_offset and/or K_mac may be configured for each band. For example, in the GEO scenario in which the distance between the satellite and the UE is long, the L band or S band, which is an FR1 band, may be used. In the LEO scenario, the Ka/Ku band, which is an FR2 band, may be used. In consideration of these features, a range for K_offset may be configured/indicated for each FR. The bit-width and/or granularity for indicating the K_offset/K_mac may differ among FRs. A frequency band used in the related NTN may be defined as shown in Table 9 below. Here, the L band may be defined as a band from 1 GHz to 2 GHZ, the S band may be defined as a band from 2 GHz to 4 GHz, the Ku band may be defined as a band from 12 GHz to 18 GHz, and the Ka band may be defined as a band from 26.5 GHz to 40 GHz.

Alternatively, in addition to the method of distinguishing K_offset for each FR, the range (and/or granularity) of K_offset and/or K_mac may be configured for each of the frequency bands for supporting the NTN (e.g., a specific range of K_offset may be mapped or tied to each frequency band or FR), and a corresponding value of K_offset may be indicated/configured for each frequency band according to the mapping result. The frequency band may differ between FDD/TDD. In particular, in the case of FDD, the same K offset/K_mac value may be configured identically in UL and DL as a pair, or may be limitedly configured for the UL band.

Alternatively, multiple ranges of K_offset/K_mac may be configured for each specific frequency band or FR, and K_offset and/or K_mac for the specific frequency band may be configured by the BS within the ranges. For example, K_offset 1 may be configured within {0, . . . , 42000}, which is a first range, K_offset 2 may be configured within a second range, {0, . . . , 84000}, and the configuration information thereon may be indicated by a higher layer signal such as SIB or RRC, or may be implicitly determined based on the orbit information as described above.

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |

-continued

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n29 | N/A | 717 MHz-728 MHz | SDL |
| n30[3] | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD[1] |
| n51 | 1427 MHz-1432 MHz | 1427 MHz-1432 MHz | TDD |
| n65 | 1920 MHz-2010 MHz | 2110 MHz-2200 MHz | FDD[4] |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD[5] |
| n91 | 832 MHz-862 MHz | 1427 MHz-1432 MHz | FDD[9] |
| n92 | 832 MHz-862 MHz | 1432 MHz-1517 MHz | FDD[9] |
| n93 | 860 MHz-915 MHz | 1427 MHz-1432 MHz | FDD[9] |
| n94 | 880 MHz-915 MHz | 1432 MHz-1517 MHz | FDD[9] |
| n95[8] | 2010 MHz-2025 MHz | N/A | SUL |

As such, in Proposal 2, a request for update of UE-specific K_offset may be made in an appropriate situation by specifically defining conditions for triggering update of the UE-specific K_offset. In addition, by explicitly specifying the update time of the K_offset, ambiguity in relation to application of the update of the K_offset between the UE and the BS may be resolved.

The above-described update of the K_offset and whether to apply the updated value of K_offset may be determined according to a signal transmitted by the UE and/or the BWP. Hereinafter, the case where the updated value of K_offset is applied or the case where the updated value is not applied will be described in detail.

(2) Proposal 3

In Proposal 3, a method for efficiently defining K_offset related to a RACH procedure and/or an initial BWP is proposed. As in the Proposals 1 and 2 described above, the cell-specific K_offset may be delivered or configured through system information, and the UE-specific K_offset may be configured and/or updated based on the differential from the is the cell-specific K_offset indicated through MAC-CE or RRC reconfiguration.

The BS may configure an initial value of K_offset (or cell-specific K_offset) for the UE through system information, and configure or update the UE-specific K_offset through a separate control signal (RRC reconfiguration, MAC-CE).

In this regard, to determine whether to update the value of K_offset configured for the UE by the BS, at least one of the following conditions may be considered.

1) K_offset for the initial BWP configured through system information (or K_offset configured through the system information, or cell-specific K_offset) may be configured for a fall-back operation of the UE, and accordingly the initially configured value of K_offset may be predetermined not to be updated. Specifically, the UE may receive a configuration of an initial value of K_offset (or the value of K_offset for the initial BWP) from the system information, and the initial value may be a value that is not updated, for the fallback operation of the UE. That is, the UE may continuously maintain and store information on the K_offset for the initial BWP.

2) Cell-specific K_offset and UE-specific K_offset may be distinguished and signaled. Specifically, as described in proposal 1 and/or proposal 2, the cell-specific K_offset (or K_offset for the initial BWP) may be configured as an initial value through signaling of SIB, which is system information, and the UE-specific K_offset may be configured or updated through MAC-CE and RRC signaling that is distinct from the signaling of the SIB. For example, the UE-specific K_offset may be configured as 'the value of the cell-specific K_offset-difference' through MAC-CE and RRC.

In this case, the cell-specific K_offset may be maintained at the value set in the initial access step (it may be stored in the memory of the UE). The values of K_offset (e.g., UE-specific K_offset values) that are indicated/updated by UE-specific/UE-dedicated signaling (e.g., UE-dedicated RRC, MAC-CE, or DCI) may be varied (updated) and applied/configured while the UE receives service from an NTN cell. In other words, the K_offset signaled through the SIB (initial K_offset or cell-specific K_offset) may not be updated, and the K_offset (e.g., UE-specific K_offset) configured through UE-specific signaling such as MAC-CE may be updated or varied by the UE-specific signaling.

That is, the value of K_offset related to the RACH procedure (or the initial value carried by system information) is not updated. Here, the value of K_offset related to the RACH procedure may be defined or considered as the cell-specific K_offset described above. Different values of K_offset may be applied according to a timeline used. The value(s) of K_offset used in the RACH procedure is not updated through RRC or MAC-CE because it is considered or treated as a cell-specific K_offset. The value of K_offset related to the RACH procedure may be considered for a timing relationship or in relation to at least one of i) and ii).

The K_offset (e.g., the cell-specific K_offset or the initial value signaled through the system information) may be used to improve i) the transmission timing of a RAR grant scheduled PUSCH (including fallback RAR scheduled PUSCH), and/or ii) the timing relationship of HARQ-ACK on PUCCH to MsgB/Msg4.

Specifically, the initial value of the K_offset (or the cell-specific K_offset) configured from the system information may be used to determine the transmission timing of the RAR grant scheduled PUSCH, or the transmission timing of the HARQ-ACK of MSG B and/or MSG 4. As described above, if the uplink signal related to the RACH procedure is transmitted, the UE may determine the transmission timing of the uplink signal related to the RACH procedure based on the cell-specific K_offset value (or the initial value configured through system information) rather than the updated K_offset even when the UE-specific K_offset is configured or updated based on the cell-specific K_offset through MAC-CE, etc.

Alternatively, the update of the RACH-related K_offset may be limited and applied to the case of contention free random access (CFRA).

Alternatively, when both RRC reconfiguration based update and MAC-CE based update are used, granularity may be configured differently for RRC reconfiguration and MAC-CE based update in order to reduce signaling overhead. For example, the update of K_offset based on the RRC reconfiguration may indicate adjustment or update of a value of a relatively large unit (e.g., K_offset in units of several to several tens of msec), and the update of the K_offset based on the MAC-CE may indicate adjustment or update of a value of a relatively small unit (e.g., K_offset in units of 0.1 to 1 msec). In this case, the final applied value of K_offset may be determined based on values indicated through the most recent (valid) RRC and MAC-CE. Here, in order to determine whether indicated values are valid (or to determine valid values), a predetermined timing window may be configured. In this case, only values indicated within the predetermined timing window may be determined as valid indicated values. Alternatively, the UE may determine whether the indicated values are valid by performing a calculation related to validity based on a threshold. When the indicated values are not valid, the UE may determine or use a specific default value (e.g., a value configured through the SIB) as the value of K_offset.

Alternatively, an additional update of K_offset may be performed based on a differential indicated by MAC-CE from a value updated by RRC reconfiguration. Here, the value indicated by the MAC-CE may have a positive (+) value and/or negative (−) value. For example, as an update value of the K_offset, X may be indicated through RRC reconfiguration, and Y may be indicated through MAC-CE. In this case, the final value of K_offset may be determined based on a predefined function of X and Y. For example, the final K_offset may be determined or configured as a value of X+Y.

Alternatively, the value of K_offset may be configured for each of multiple BWPs. Specifically, UEs may perform wireless communication using multiple BWPs in the NTN wireless system. In this case, the value of K_offset may be configured as a different value for each of the BWPs. Here, when the value of K_offset is updated, the K_offset related to the RACH procedure may not be updated (in the initial BWP).

Here, the value of K_offset indicated in the initial BWP (i.e., the value of K_offset indicated through system information) may not need to be updated with a cell-specific value of K_offset. In this case, the value of K_offset indicated in a BWP other than the initial BWP may be indicated as a value of beam-specific or beam-group-specific K_offset (i.e., UE-specific offset).

A frequency reuse factor may be increased for interference mitigation in NTN. As a method therefor, an FDM scheme for dividing resources in the frequency domain may be considered. Specifically, resources in the frequency domain may be FDMed in a BWP and/or component carrier (CC) level.

Multiple beams (e.g., SSB and/or CSI-RS) may be used, considering that the coverage (or the size of the cell) covered by the NTN cell is very large. In this case, at least one beam corresponding to a specific SSB and/or CSI-RS (connected to the specific SSB by QCL-D) may be pre-mapped to each frequency region (e.g., BWP) for fast beam switching. In this case, fast beam switching may be achieved automatically through BWP switching in an NTN system having a large latency. In addition, since the coverage (or the size of the cell) covered by the NTN is very large (e.g., several thousand km), there may be a difference in round-trip delay between the multiple beams configured in the cell. Accordingly, the value of the K_offset may be configured differently according to a beam or a beam group. In this case, in the NTN, specific beam(s) may be configured/indicated by being mapped to a BWP for effective interference management. Accordingly, the K_offset needs to be configured differently for each BWP.

For example, the BS may indicate/configure values of multiple K_offsetd through system information, and the value of each K_offset may be mapped to each BWP ID. The mapping order or mapping relationship (e.g., the mapping relationship between the BWP ID and the value of K_offset) may be predetermined or may be additionally configured/indicated by the BS. In addition, in order to reduce signaling overhead that may be caused by indicating multiple K_offsets for multiple BWPs, the BS may configure a reference K_offset among the K_offsets and indicate/configure a differential of each of the remaining K_offsets from the reference K_offset. For example, the BS may use a K_offset indicated in an initial BWP as a reference value, and configure/indicate the values of K_offsets for the remaining BWPs by differentials from the reference value. In general, the value of the cell-specific K_offset is determined assuming the worst case, and accordingly the value of the cell-specific K_offset may be set to the largest value (max value) among all configurable values of K_offset. In this case, the value of K_offset configured in a BWP other than the initial BWP may be configured by applying or reflecting a negative difference value to the K_offset for the initial BWP. In other words, since K_offset for the initial BWP has the maximum value, a difference value indicating or configuring the value of K_offset for each BWP may be negative.

In this way, even if the UE-specific K_offset is configured or updated, the UE may perform UI, signal transmission based on an initial value (cell-specific K_offset) configured by system information for an UL signal related to RACH, thereby ensuring a fall-back operation of the UE related to the RACH procedure.

(4) Proposal 4

Figure 13:
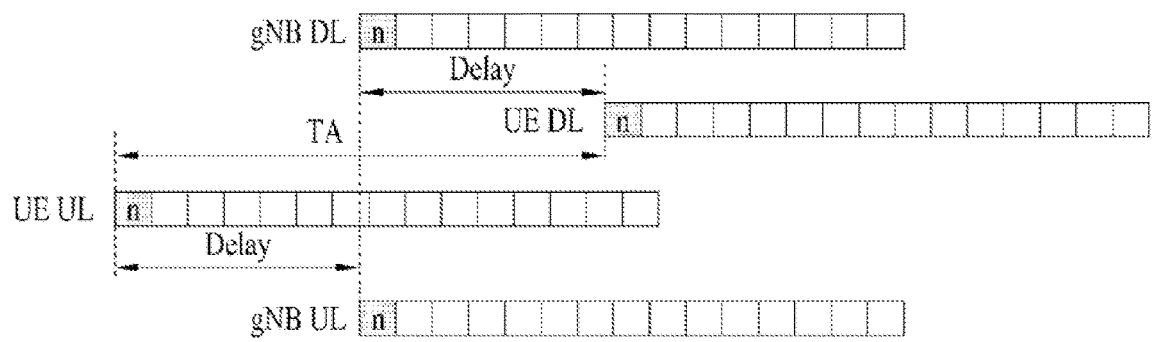
FIGS. 13 and 14 illustrate configuring K_mac in relation to timing alignment of DL and UL frames.
Figure 13:
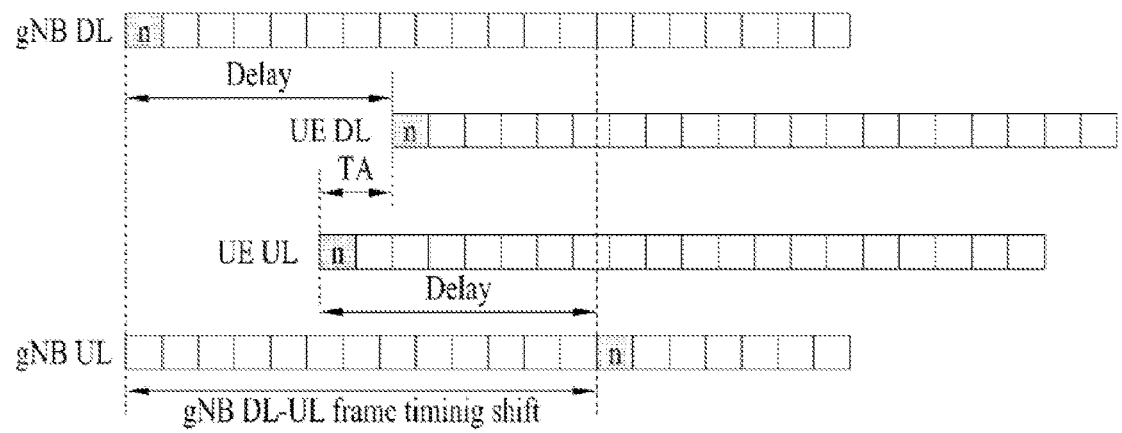
Figure 14:
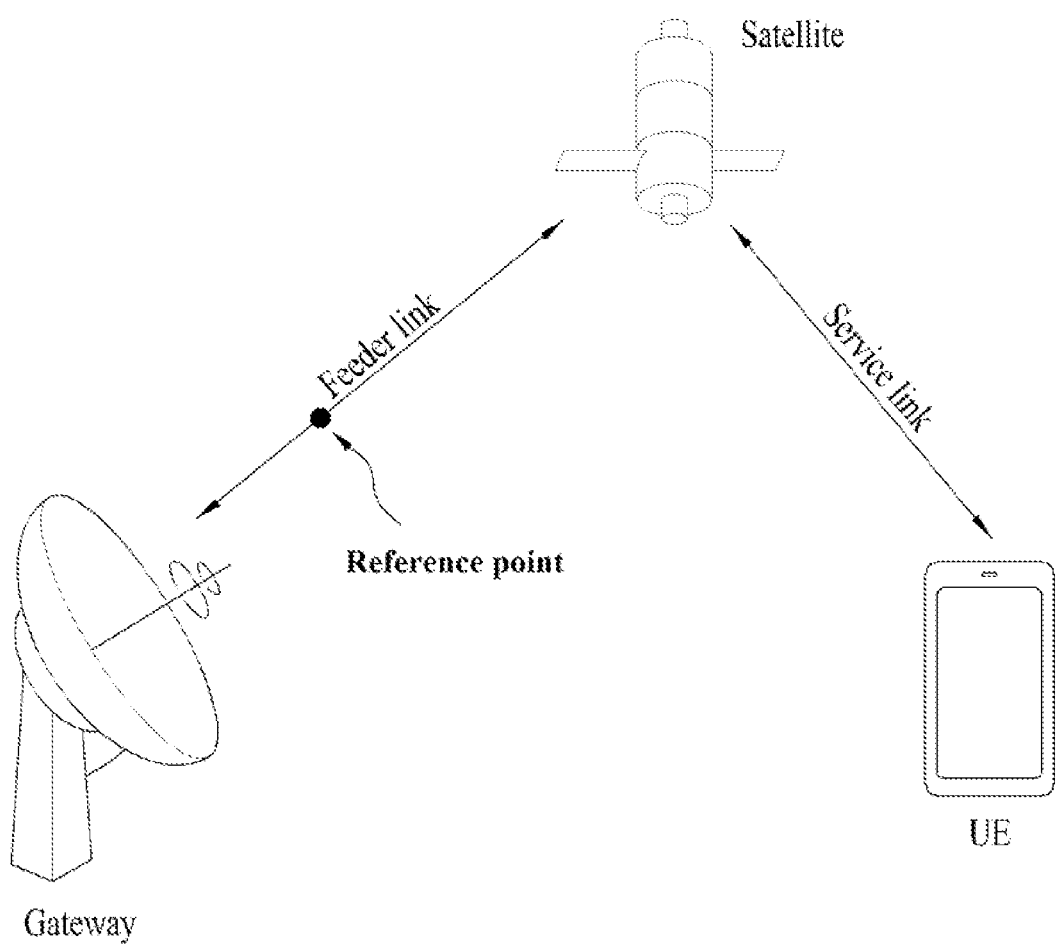

FIGS. 13 and 14 illustrate configuring K_mac in relation to timing alignment of DL and UL frames.

The following scenario may be considered in relation to the MAC-CE action timing.

Regarding K_mac as a scheduling offset other than the K_offset, 1) when DL and UL frame timings are aligned at gNB: i) K_mac may not be required for the UE operation and assumption for DL configuration indicated by a MAC-CE instruction on the PDSCH; ii) K_mac may not be required for the UE operation and assumption for UL configuration indicated by a MAC-CE instruction on the PDSCH. 2) When DL and UL frame timings are not aligned at gNB: i) K_mac may be required for the UE operation and assumption for DL configuration indicated by a MAC-CE instruction on the PDSCH; ii) K_mac may not be required for the UE operation and assumption for UL configuration indicated by a MAC-CE instruction on the PDSCH. 3) Note: Here, identifying an exceptional MAC CE timing relationship that may or may not require K_mac is not excluded.

In the NTN, K_mac, which is an additional timing offset for applying the MAC-CE action timing as described above, may be configured/indicated. Schemes 1) and 2) below may be considered for configuration/indication of K_mac.

1) Explicit signaling (if UL-DL frame timing at gNB is not aligned): i) K_mac may be signaled at the same time as configuration of a cell-specific K_offset. Alternatively, ii) K_mac may be signaled by SIB, RRC, MAC-CE or DCI (e.g., group-common DCI).

2) Implicit signaling: K_mac may be implicitly signaled through i) signaling of UL-DL frame timing shift, ii) signaling of a reference point iii) common TA.

In the implicit signaling scheme (when K_mac is not explicitly signaled), the UE may infer K_mac through other parameters indicated by the network. K_mac may be inferred based on a function using some or all of the parameters. As an example of the parameters, signaling of a UL-DL frame timing shift, signaling of a reference point, and common TA may be considered. Here, the UL-DL frame timing shift is a timing difference between the UL and DL frames of the BS (gNB) and may be represented by slots and/or symbols (or absolute time (in msec)). As shown in FIG. 14, the reference point may be a point (feeder link) present between a gateway and a satellite, a point (service link) present between a satellite and a UE, or a point for defining the common TA. Here, the common TA may be used to support the distance between the satellite and the reference point (e.g., full TA=UE specific TA (to cover service link)+common TA). The implicit signaling scheme may reduce the overhead of duplicated signaling.

Figure 15:
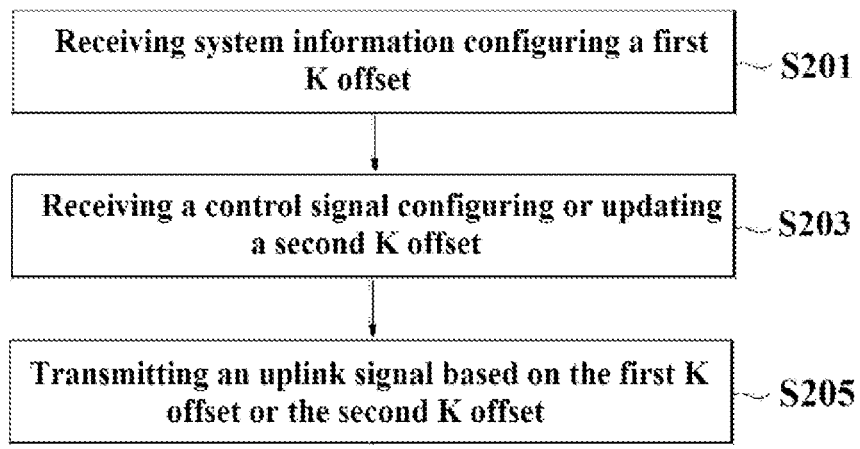
FIG. 15 illustrates a method for transmitting an uplink signal by a UE based on a K offset.

FIG. 15 illustrates a method for transmitting an uplink signal by a UE based on a K_offset.

Referring to FIG. 15, the UE may receive system information for configuring a first K offset from the BS (S201). The first K_offset is an offset that is additionally considered in determination of a transmission timing of a UL signal in an NTN. The first K_offset configured through the system information may be an initial value of the K_offset or may be a cell-specific K_offset.

Next, the UE may receive a control signal for configuring or updating a second K_offset based on the first K_offset from the BS (S203). The second K_offset may correspond to the UE-specific K_offset or the beam (group)-specific K_offset, as described above. The control signal may include an update value for configuring the second K_offset. As described above, the update value may be a difference based on the first K_offset. For example, the UE may configure or update a value obtained by adding or subtracting the update value to or from the value for the first K_offset as the second K_offset. Alternatively, the update value may be indicated or configured through a media access control element (MAC-CE) included in the control signal. Alternatively, the control signal may be a signal related to RRC reconfiguration.

As described above in Proposal 3, the first K_offset is a cell-specific K_offset and is not updated by the control signal. That is, only the second K_offset may be updated based on the control signal.

Alternatively, the second K_offset may be configured for each of multiple BWPs. For example, the NTN may support multiple BWPs, and a corresponding second value of K_offset may be configured for each of the BWPs. In this case, the UE may configure or update the second K_offset for the corresponding BWP based on the control information.

Alternatively, the second K_offset may be configured for each beam group related to the UE. For example, the UE may communicate with the BS based on multiple beam groups. In this case, the UE may configure or update the corresponding second K_offset for each beam group through the control signal, as described above.

As described above in Proposal 2, the updated second K_offset (e.g., the second K_offset updated through the difference indicated in the MAC-CE of the control signal) may be applied a preset time (x slots, x symbols, or x ms) later than a transmission time of an ACK for successful reception of the MAC-CE. Alternatively, the updated second K_offset may be applied a preset time (x slots, x symbols, x ms) after the time when the ACK is received by the BS.

Next, the UE may transmit a UL signal based on the first K_offset or the second K_offset (S205). Specifically, as described with reference to FIG. 12, in an NTN, the UE may determine the transmission timing of the UL signal, additionally considering the K_offset. In other words, the UE may determine the transmission timing of the UL signal in consideration of the first K offset and/or the second K_offset as well as the TA value in determining the transmission timing of the UL signal.

Alternatively, the UE may determine at least one K_offset between the first K_offset and the second K_offset based on a kind and/or type of the UL signal. Specifically, upon receiving a configuration of the second K_offset, the UE may transmit the UL signal based on the second K offset (or the first K_offset when a difference value or an update value is not indicated from the control signal) in communication with the BS. However, when the UL signal is a RACH-related signal, the UE may transmit the UL signal based on the first K_offset, not the second K_offset even if it receives the configuration of the second K_offset, which is the UE-specific K_offset. That is, in order to ensure the fallback operation, the UL signal related to the RACH is always transmitted based on the first K_offset configured by the system information, not the second K offset, which is the UE-specific K_offset. Here, the signal related to the RACH procedure may be an UL signal scheduled by a random access response (RAR) UL grant as described above, or an UL signal including an ACK for Msg B (or Msg 4).

Alternatively, when the UL signal is the signal related to the RACH procedure for contention free random access (CFRA), the UE may transmit the UL signal based on the first K offset and the second K_offset.

Alternatively, the first K_offset is not updated to a cell-specific K_offset by the control signal. That is, when receiving the control signal, the UE may vary or update only the second K offset except the first K_offset, and the first K_offset may be maintained as an initial value.

Figure 16:
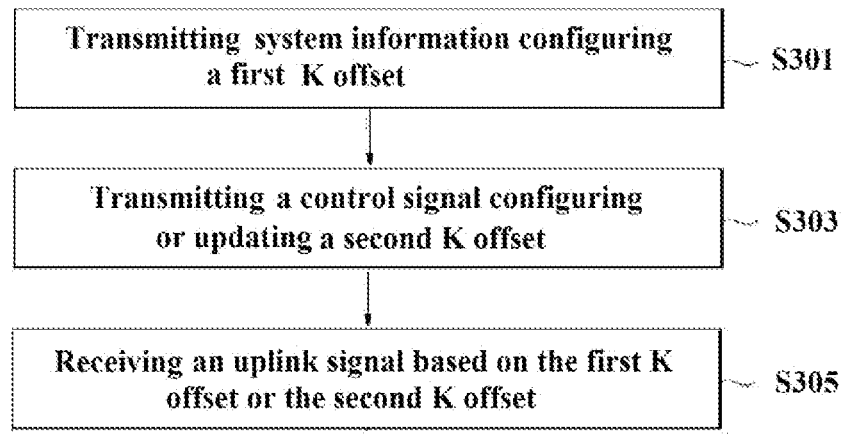
FIG. 16 illustrates a method for receiving an uplink signal from the UE by a base station.

FIG. 16 illustrates a method for receiving an uplink signal from the UE by a BS.

Referring to FIG. 15, the BS may transmit system information for configuring a first K offset to the UE (S301). The first K_offset is an offset that is additionally considered in determination of a transmission timing of a UL signal in an NTN. The first K_offset configured through the system information may be an initial value of the K_offset or may be a cell-specific K_offset. That is, the BS may configure a cell-specific K_offset for the UE through system information.

Next, the BS may transmit a control signal for configuring or updating a second K_offset based on the first K_offset to the UE (S303). The second K_offset may correspond to the UE-specific K_offset or the beam (group)-specific K_offset, as described above. The control signal may include an update value for configuring the second K_offset. As described above, the update value may be a difference based on the first K_offset. For example, the BS may transmit a difference between the first K_offset and the second K_offset to be configured to the UE through the control signal to instruct the UE to configure and/or update the second K_offset. Alternatively, the update value may be indicated or configured through a media access control element (MAC-CE) included in the control signal. Alternatively, the control signal may be a signal related to RRC reconfiguration.

As described above in Proposal 3, the first K_offset is a cell-specific K_offset and is not updated by the control signal. That is, only the second K_offset may be updated based on the control signal.

Alternatively, the second K_offset may be configured for each of multiple BWPs. For example, the NTN may support multiple BWPs, and a corresponding second value of K_offset may be configured for each of the BWPs. In this case, the BS may configure or update the second K_offset for each corresponding BWP through the control information.

Alternatively, the second K_offset may be configured for each beam group related to the UE. For example, the BS may provide an instruction for configuring or updating the second K offset corresponding to each beam group through the control signal.

Next, the BS may receive the UL signal transmitted by the UE based on the first K_offset or the second K_offset (S305). Specifically, as described with reference to FIG. 12, in the NTN, the BS may determine a reception timing of the UL signal, additionally considering the K_offset. In other words, the BS may determine the reception timing of the UL signal in consideration of the first K_offset and/or the second K_offset as well as the TA value in determining the reception timing of the UL signal.

Alternatively, the BS may receive the UL signal based on the first K_offset and/or the second K_offset based on a kind and/or type of the UL signal to be transmitted by the UE. Specifically, when the BS configures the second K_offset for the UE, the BS may receive the UL signal based on the second K_offset (or the first K_offset and the second K_offset). However, when the UL signal is a RACH-related signal, the BS receive the UL signal based on the first K offset, not the second K_offset even if the second K_offset, which is the UE-specific K_offset, is configured for the UE.

That is, in order to ensure the fall-back operation, when the UL signal is a RACH-related UL signal, the BS always receives the UL signal based on the first K_offset configured by the system information, not the second K_offset, which is the UE-specific K_offset. Here, the signal related to the RACH procedure may be an UL signal scheduled by a random access response (RAR) UL grant as described above, or an UL signal including an ACK for Msg B (or Msg 4).

Alternatively, when the UL signal is the signal related to the RACH procedure for contention free random access (CFRA), the BS may receive the UL signal based on the first K offset and the second K_offset (or based on the second K_offset).

Alternatively, the first K_offset is not updated to a cell-specific K_offset by the control signal. That is, the BS may vary or update only the second K_offset except the first K_offset through the control signal. In this case, the first K_offset may be maintained as an initial value.

In this way, the K_offset may be additionally reflected in consideration of the characteristics of the NTN, and a UE-specific K_offset may be introduced for each UE. Also, the UE may be limited to always transmit an UL signal related to the RACH procedure based on a cell-specific K_offset configured through system information, rather than the UE-specific K offset. Thereby, the fall-back operation of the UE may be efficiently ensured.

In addition, examples of the above-described proposed methods may also be included as one of the implementation methods of the present disclosure, and therefore it is apparent that they may be regarded as a kind of proposed methods. In addition, the above-described proposed methods may be implemented independently, or may be implemented by combining (or merging) some of the proposed methods. A rule may be defined such that the BS may provide the UE with information about whether the proposed methods are to be applied (or information about the rules of the proposed methods) through a predefined signal (e.g., a physical layer signal or a higher layer signal). The higher layer may include, for example, one or more of functional layers such as MAC, RLC, PDCP, RRC, and SDAP.

Methods, embodiments or descriptions for implementing the method proposed in the present disclosure may be applied separately, or one or more of the methods (or embodiments or descriptions) may be applied in combination.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 17:
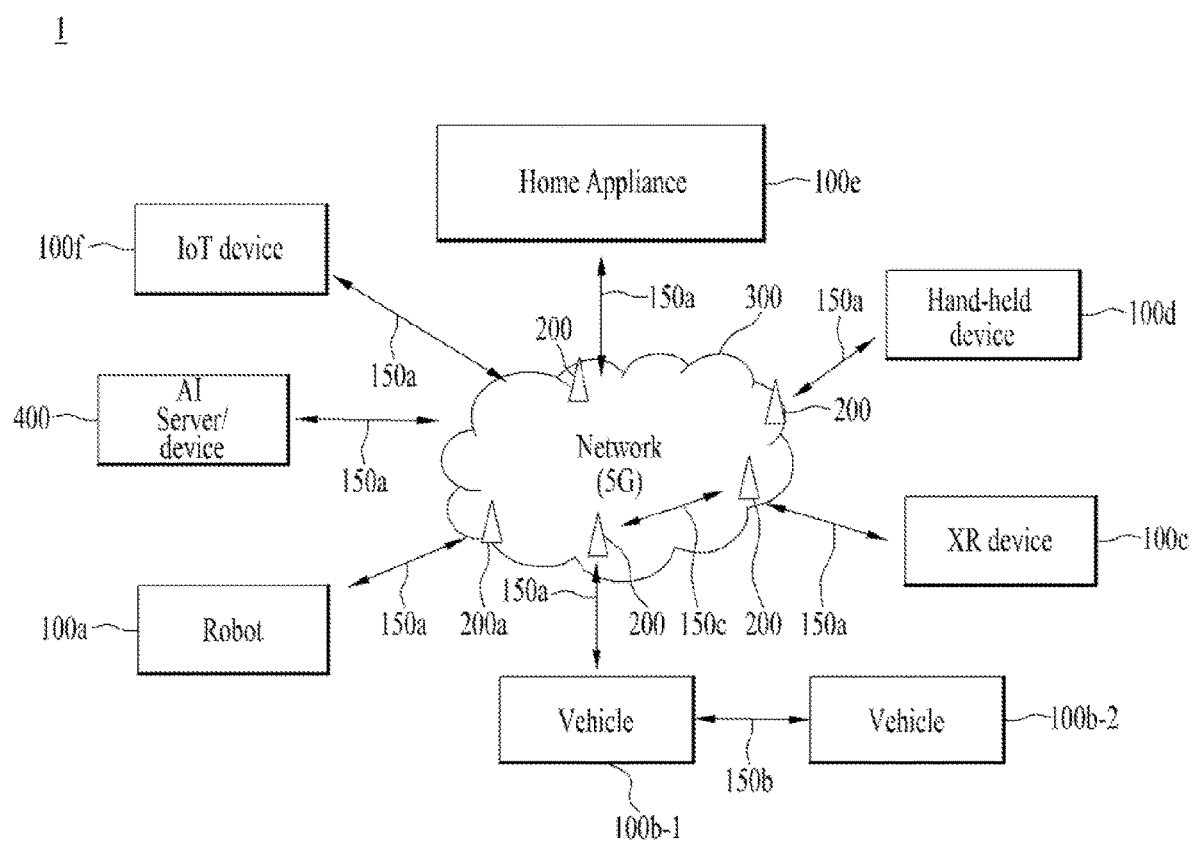
FIG. 17 illustrates a communication system applied to the present disclosure.

FIG. 17 illustrates a communication system applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 18:
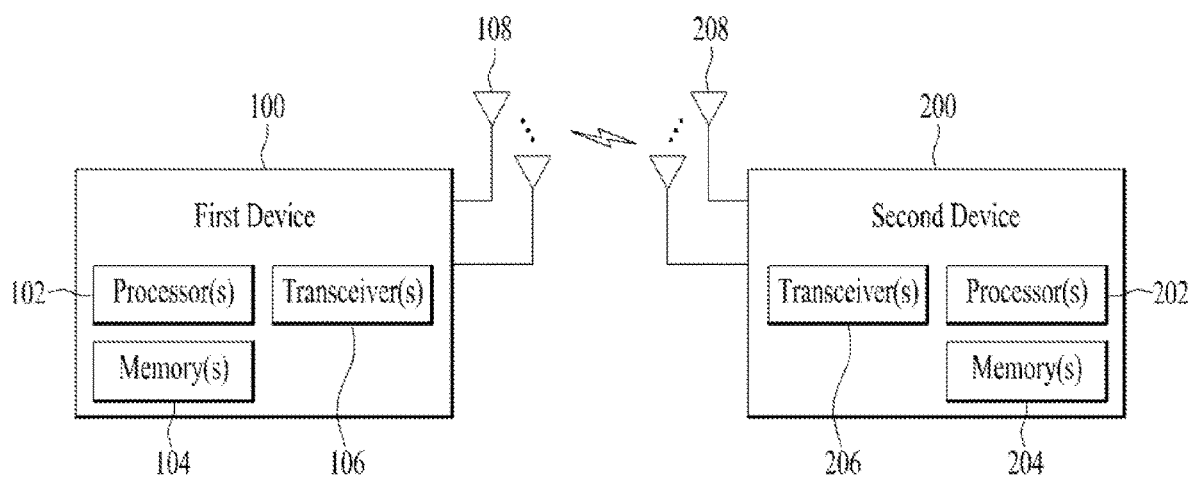
FIG. 18 illustrates wireless devices applicable to the present disclosure.

FIG. 18 illustrates a wireless device applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to an example, the first wireless device 100 or the UE may include the processor 102 connected to the RF transceiver, and the memory 104. The memory 104 may include at least one program capable of performing operations related to the embodiments described with reference to FIGS. 11 to 16.

Specifically, the processor 102 may control the RF transceiver 106 to receive system information for configuring a first K_offset, receive a control signal for configuring or updating a second K_offset based on the first K_offset, and transmit the uplink signal based on the first K offset or the second K_offset, wherein, based on the uplink signal being related to a random access channel (RACH), the uplink signal may be transmitted based on the first K_offset.

Alternatively, a chipset including the processor 102 and the memory 104 may be configured. In this case, the chipset may include at least one processor and at least one memory operatively coupled to the at least one processor and, when executed, causing the at least one processor to perform an operation. The operation may include receiving system information for configuring a first K_offset, receiving a control signal for configuring or updating a second K offset based on the first K_offset, and transmitting the uplink signal based on the first K_offset or the second K_offset, wherein, based on the uplink signal being related to a random access channel (RACH), the uplink signal may be transmitted based on the first K_offset. Also, the at least one processor may perform operations for the embodiments described with reference to FIGS. 11 to 16 based on a program included in the memory.

Alternatively, provided herein is a computer-readable storage medium comprising at least one computer program for causing the at least one processor to perform an operation. The operation may include receiving system information for configuring a first K_offset, receiving a control signal for configuring or updating a second K_offset based on the first K_offset, and transmitting the uplink signal based on the first K_offset or the second K_offset, wherein, based on the uplink signal being related to a random access channel (RACH), the uplink signal may be transmitted based on the first K_offset. In addition, the computer program may include programs capable of performing operations for the embodiments described with reference to FIGS. 11 to 16.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to one embodiment, the base station or NTN may include the processor 202, the memory 204 and/or the transceiver 206. The processor 202 may control the transceiver 206 or RF transceiver to receive system information for configuring a first K_offset, receive a control signal for configuring or updating a second K_offset based on the first K_offset, and transmit the uplink signal based on the first K_offset or the second K_offset, wherein, based on the uplink signal being related to a random access channel (RACH), the uplink signal may be transmitted based on the first K_offset. Also, the processor 202 may perform the above-described operations based on the memory 204 including in at least one program capable of performing the operations related to the embodiments described with reference to FIGS. 11 to 16.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
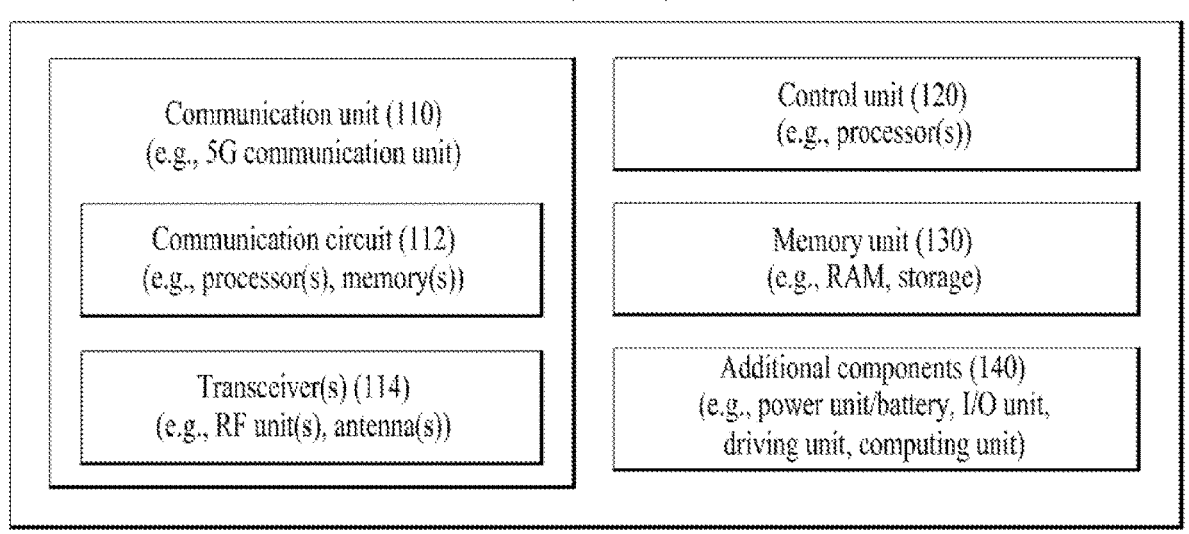
FIG. 19 illustrates another example of a wireless device to which the present disclosure is applied.

Examples of Application of Wireless Devices to which the Present Invention is Applied FIG. 19 illustrates another example of a wireless device applied to the present disclosure.

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method performed by a UE (User Equipment), the method comprising:
   receiving system information including a first K_offset related to a K_offset for a non-terrestrial network (NTN);
   receiving a control signal including an update value for updating the K_offset for the NTN;
   based on an uplink signal being related to a RAR (Random Access Response), transmitting the uplink signal at a transmission timing determined based on the first K_offset without applying the update value; and
   based on the uplink signal being not related to the RAR, transmitting the uplink signal at the transmission timing determined based on the K_offset obtained by applying the update value to the first K_offset.

2. The method of claim 1, wherein the update value is included in a media access control element (MAC-CE) of the control signal.

3. The method of claim 2, wherein the K_offset obtained by applying the update value to the first K_offset is applied x preconfigured slots after a time when an acknowledgment (ACK) for successful reception of the MAC-CE is transmitted.

4. The method of claim 1, wherein the first K_offset is a value for configuring a cell-specific K_offset.

5. The method of claim 1, wherein the uplink signal related to the RAR is an uplink signal scheduled by a RAR uplink grant an uplink signal scheduled by a fallbackRAR uplink grant, or an uplink signal including an acknowledgment (ACK) for the RAR.

6. The method of claim 1, wherein the K_offset for the NTN is configured for each of a plurality of bandwidth parts (BWP).

7. The method of claim 1, wherein the K_offset for the NTN is configured for each of a plurality of beam groups.

8. A UE (User Equipment) comprising:
   a radio frequency (RF) transceiver; and
   a processor connected to the RF transceiver,
   wherein the processor controls the RF transceiver to:
   receive system information including a first K_offset related to a K_offset for a non-terrestrial network (NTN);
   receive a control signal including an update value for updating the K_offset for the NTN;
   based on an uplink signal being related to a RAR (Random Access Response), transmitting the uplink signal at a transmission timing determined based on the first K_offset without applying the update value; and
   based on the uplink signal being not related to the RAR, transmitting the uplink signal at the transmission timing determined based on the K_offset obtained by applying the update value to the first K_offset.

9. A non-transitory computer-readable medium recording a program code for performing the method according to claim 1.

* * * * *